(12) United States Patent
Pham et al.

(10) Patent No.: US 8,980,454 B2
(45) Date of Patent: Mar. 17, 2015

(54) SYSTEMS AND METHODS FOR REBALANCING REDOX FLOW BATTERY ELECTROLYTES

(71) Applicant: EnerVault Corporation, Sunnyvale, CA (US)

(72) Inventors: Ai Quoc Pham, Milpitas, CA (US); On Kok Chang, San Jose, CA (US)

(73) Assignee: Enervault Corporation, Sunnyvale, CA (US)

( * ) Notice: Subject to any disclaimer, the term of this patent is extended or adjusted under 35 U.S.C. 154(b) by 0 days.

(21) Appl. No.: 14/207,795

(22) Filed: Mar. 13, 2014

(65) Prior Publication Data

US 2014/0272483 A1    Sep. 18, 2014

Related U.S. Application Data

(60) Provisional application No. 61/798,796, filed on Mar. 15, 2013.

(51) Int. Cl.
*H01M 8/04* (2006.01)
*H01M 8/18* (2006.01)
*H01M 8/20* (2006.01)

(52) U.S. Cl.
CPC ........ *H01M 8/04276* (2013.01); *H01M 8/0482* (2013.01); *H01M 8/188* (2013.01); *H01M 8/20* (2013.01); *Y02E 60/528* (2013.01)
USPC .......................................................... 429/51

(58) Field of Classification Search
CPC ....... H01M 8/188; H01M 8/20; Y02E 60/528
USPC ................. 429/51, 60; 205/57, 775
See application file for complete search history.

(56) References Cited

U.S. PATENT DOCUMENTS 4,159,366 A *  6/1979  Thaller .................... 429/444
4,307,159 A   12/1981  Hammond et al.
4,362,791 A   12/1982  Kaneko et al.
4,377,623 A    3/1983  Parker et al.

(Continued)

FOREIGN PATENT DOCUMENTS

JP        60148068 A    8/1985
JP        63076268 A    4/1988

(Continued)

OTHER PUBLICATIONS

Extended European Search Report for European Application No. 09795056 mailed Mar. 31, 2014.

(Continued)

*Primary Examiner* — Ula C Ruddock
(74) *Attorney, Agent, or Firm* — The Marbury Law Group, PLLC

(57) ABSTRACT

Various methods of rebalancing electrolytes in a redox flow battery system include various systems using a catalyzed hydrogen rebalance cell configured to minimize the risk of dissolved catalyst negatively affecting flow battery performance. Some systems described herein reduce the chance of catalyst contamination of RFB electrolytes by employing a mediator solution to eliminate direct contact between the catalyzed membrane and the RFB electrolyte. Other methods use a rebalance cell chemistry that maintains the catalyzed electrode at a potential low enough to prevent the catalyst from dissolving.

9 Claims, 15 Drawing Sheets

(56) References Cited

U.S. PATENT DOCUMENTS

| | | | |
|---|---|---|---|
| 4,543,302 A | 9/1985 | Gahn et al. | |
| 4,576,878 A | 3/1986 | Gahn | |
| 4,732,827 A | 3/1988 | Kaneko et al. | |
| 4,786,567 A | 11/1988 | Skyllas-Kazacos et al. | |
| 4,814,241 A | 3/1989 | Nagashima et al. | |
| 4,874,483 A | 10/1989 | Wakabayashi et al. | |
| 4,882,241 A * | 11/1989 | Heinzel | 429/107 |
| 4,956,244 A | 9/1990 | Shimizu et al. | |
| 5,135,820 A | 8/1992 | Jones | |
| 5,250,158 A | 10/1993 | Kaneko et al. | |
| 5,258,241 A * | 11/1993 | Ledjeff et al. | 429/498 |
| 5,368,762 A | 11/1994 | Magome et al. | |
| 5,587,132 A | 12/1996 | Nakajima et al. | |
| 5,612,148 A | 3/1997 | Zito | |
| 6,143,443 A | 11/2000 | Kazacos et al. | |
| 6,455,187 B1 | 9/2002 | Tomazic | |
| 6,468,688 B2 | 10/2002 | Kazacos et al. | |
| 6,613,298 B2 | 9/2003 | Tanaka et al. | |
| 6,652,819 B2 | 11/2003 | Shiroto et al. | |
| 6,764,663 B2 | 7/2004 | Monaghan et al. | |
| 6,764,789 B1 | 7/2004 | Sekiguchi et al. | |
| 6,841,294 B1 | 1/2005 | Morrissey et al. | |
| 6,864,012 B2 | 3/2005 | Tomazic | |
| 6,872,376 B2 | 3/2005 | Tanaka et al. | |
| 6,986,966 B2 | 1/2006 | Clarke et al. | |
| 7,078,123 B2 | 7/2006 | Kazacos et al. | |
| 7,156,972 B2 | 1/2007 | Diel et al. | |
| 7,258,947 B2 | 8/2007 | Kubata et al. | |
| 7,297,437 B2 | 11/2007 | Clarke et al. | |
| 7,927,731 B2 * | 4/2011 | Sahu | 429/101 |
| 8,338,008 B2 | 12/2012 | Zu et al. | |
| 8,394,529 B2 | 3/2013 | Keshavarz et al. | |
| 8,491,763 B2 | 7/2013 | Friesen | |
| 8,541,121 B2 | 9/2013 | Keshavarz et al. | |
| 8,551,299 B2 | 10/2013 | Keshavarz et al. | |
| 8,668,997 B2 | 3/2014 | Zaffou et al. | |
| 8,877,365 B2 | 11/2014 | Keshavarz et al. | |
| 2003/0113615 A1 | 6/2003 | Tomazic | |
| 2004/0121204 A1 | 6/2004 | Adelman et al. | |
| 2004/0241552 A1 | 12/2004 | Skyllas-Kazacos | |
| 2005/0287436 A1 | 12/2005 | Kawashige et al. | |
| 2006/0063065 A1 | 3/2006 | Clarke et al. | |
| 2009/0017379 A1 | 1/2009 | Inatomi et al. | |
| 2010/0003545 A1 * | 1/2010 | Horne et al. | 429/12 |
| 2010/0092843 A1 | 4/2010 | Conway | |
| 2010/0143781 A1 | 6/2010 | Keshavarz et al. | |
| 2010/0261070 A1 | 10/2010 | Keshavarz et al. | |
| 2011/0081561 A1 | 4/2011 | Keshavarz et al. | |
| 2011/0086247 A1 | 4/2011 | Keshavarz et al. | |
| 2011/0223450 A1 * | 9/2011 | Horne et al. | 429/72 |
| 2012/0077079 A1 | 3/2012 | Li et al. | |
| 2012/0107660 A1 | 5/2012 | Li et al. | |
| 2012/0135278 A1 | 5/2012 | Yoshie et al. | |
| 2012/0202095 A1 | 8/2012 | Winter | |
| 2012/0208061 A1 | 8/2012 | Sahu et al. | |
| 2012/0295172 A1 | 11/2012 | Peled et al. | |
| 2012/0299384 A1 | 11/2012 | Peled et al. | |
| 2013/0084482 A1 | 4/2013 | Chang et al. | |
| 2013/0095362 A1 | 4/2013 | Keshavarz et al. | |
| 2013/0157162 A1 | 6/2013 | Dong et al. | |
| 2014/0023943 A1 | 1/2014 | Keshavarz et al. | |
| 2014/0028261 A1 | 1/2014 | Esswein et al. | |
| 2014/0065460 A1 | 3/2014 | Evans et al. | |

FOREIGN PATENT DOCUMENTS

| | | |
|---|---|---|
| JP | 63148563 A | 6/1988 |
| JP | 63150861 A | 6/1988 |
| JP | 63205057 | 8/1988 |
| JP | 01012466 | 1/1989 |
| JP | S6482465 A | 3/1989 |
| JP | 60115174 A | 6/1989 |
| JP | H0758625 B2 | 6/1995 |
| JP | 0878042 | 3/1996 |
| JP | 2554113 B2 | 11/1996 |
| JP | 2596572 B2 | 4/1997 |
| JP | 3242205 B2 | 12/2001 |
| JP | 2006073471 A | 3/2006 |
| JP | 2006040648 | 9/2006 |
| JP | 3922905 B2 | 5/2007 |
| JP | 2007188729 A | 7/2007 |
| JP | 3955130 B2 | 8/2007 |
| JP | 2011119283 A | 6/2011 |
| WO | 2004/079849 A1 | 9/2004 |
| WO | 2005/014484 A1 | 2/2005 |
| WO | 2007/101284 A1 | 9/2007 |
| WO | 2007/130659 A2 | 11/2007 |
| WO | 2010/094657 A1 | 8/2010 |
| WO | 2011/111254 A1 | 9/2011 |
| WO | 2011/111717 A1 | 9/2011 |
| WO | 2011/136256 A1 | 11/2011 |
| WO | 2012-135473 A2 | 10/2012 |
| WO | 2013/027076 A1 | 2/2013 |
| WO | 2013/110421 A1 | 8/2013 |
| WO | 2013/177414 A1 | 11/2013 |

OTHER PUBLICATIONS

International Search Report and Written Opinion issue in International Application No. PCT/US2014/028670, mailed Aug. 25, 2014.

Hagedorn, "NASA Redox Storage System Development Project", U.S. Department of Energy Conservation and Renewable Energy Division of Energy Storage Systems, Final Report, Oct. 1984.

Miyake et al., "Potentiostatic Electrodeposition of Pt Nanoparticles on Carbon Black", Journal of the Electrochemical Society, J. Electrochem. Soc. 2011, vol. 158, Issue 9, pp. D590-D593.

* cited by examiner

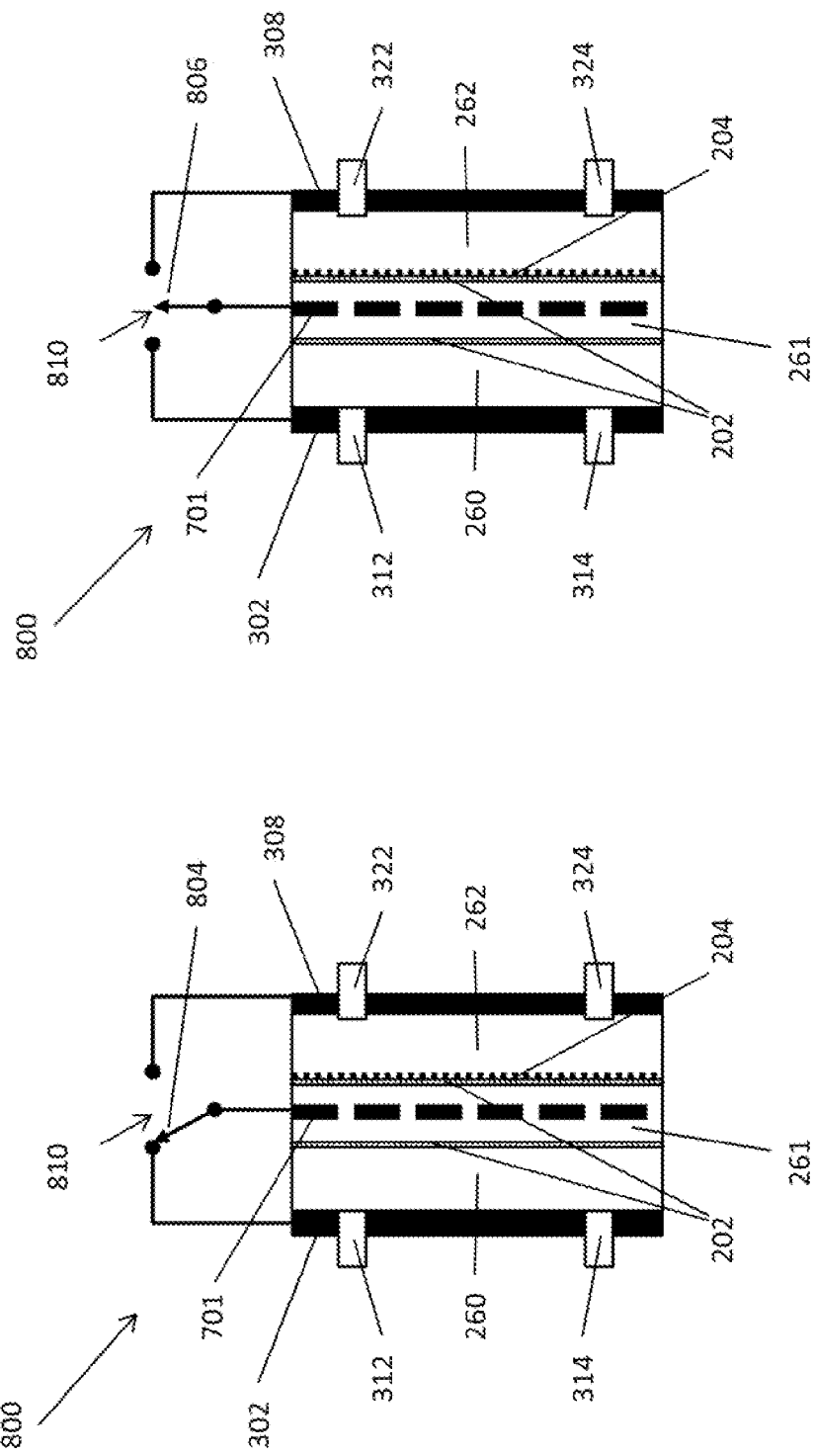

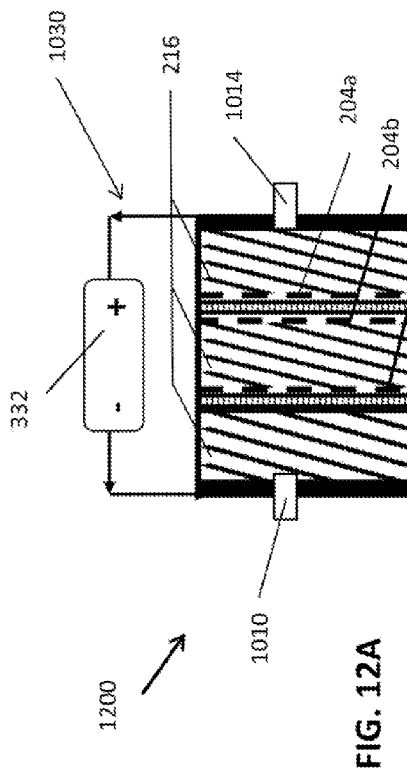
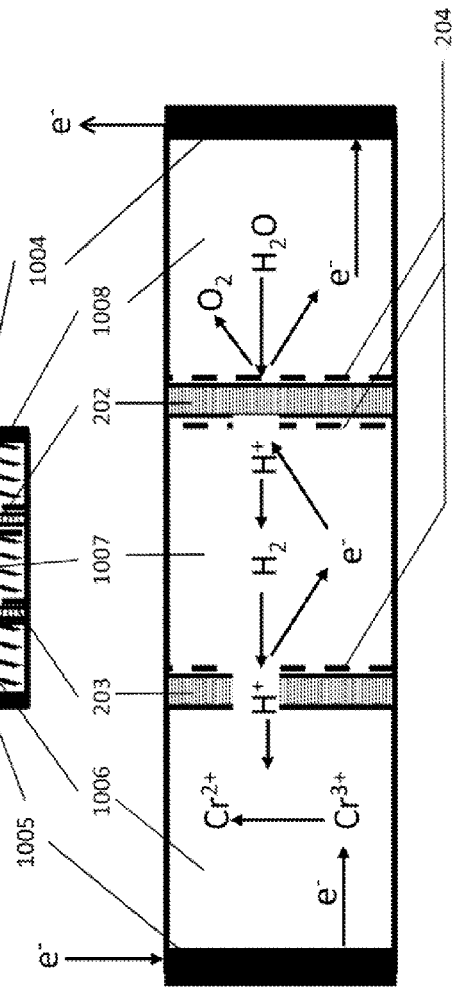
FIG. 12A
FIG. 12B

SYSTEMS AND METHODS FOR REBALANCING REDOX FLOW BATTERY ELECTROLYTES

CROSS REFERENCE TO RELATED APPLICATIONS

The present application claims priority to U.S. Provisional Patent Application No. 61/798,796 entitled "CATALYTIC REBALANCING OF REDOX ELECTROLYTES," filed Mar. 15, 2013 the entire contents of which are incorporated herein by reference.

STATEMENT OF FEDERALLY FUNDED RESEARCH

Inventions included in this patent application were made with Government support under DE-OE0000225 "Recovery Act—Flow Battery Solution for Smart Grid Renewable Energy Applications" awarded by the US Department of Energy (DOE). The Government has certain rights in these inventions.

FIELD

This invention generally relates to reduction/oxidation (redox) flow batteries and more particularly to rebalancing the reaction stoichiometry of electrolytes in redox flow batteries.

BACKGROUND

Advances in electrical energy technology are frequently impeded by a lack of appropriate means for electrical energy storage (EES). For example, renewable energy sources such as wind and solar could meet a significant proportion of the world's electricity needs. Yet these sources remain largely untapped for want of viable EES capacity. In the same way, large-scale EES will be critical to the success of initiatives to modernize the national electric power grid.

Rechargeable batteries are a proven means for EES but established battery chemistries are poorly suited for large-scale applications. They store energy in the form of solid reactants that form part of the battery electrodes. Furthermore, the electrodes must undergo physical and chemical changes each time the battery is charged and discharged. These changes impose limits not only on the cycle life but also on the maximum power (e.g., in kilowatts) that can be delivered.

Redox Flow Batteries (RFBs) are rechargeable systems in which the electrochemical reactants are dissolved in liquid electrolytes. The electrolytes, which are stored in external tanks, are pumped through a stack of reaction cells where electrical energy is alternately converted to and extracted from chemical energy in the reactants by way of reduction and oxidation reactions.

Over time the reaction stoichiometry (i.e., the stoichiometric proportions) of the two reactants may deviate from a desired relationship. When such a deviation occurs, the RFB electrolytes are said to be "imbalanced". Prior art methods for rebalancing the electrolytes substantially degrade system efficiency, either by consuming too much energy or by releasing contaminants into the RFB electrolytes that cause additional imbalance. There remains a need for methods of rebalancing RFB electrolytes while minimizing the release of harmful contaminants.

SUMMARY

Thus in various embodiments, methods and systems are provided to adjust the charge balance between electrolytes in a redox flow battery system. An embodiment rebalancing system may be configured to adjust a charge balance between a positive electrolyte and a negative electrolyte in a redox flow battery system. Further in embodiments, the rebalancing system may comprise an electrochemical reaction cell comprising a cathode chamber and an anode chamber separated from the cathode chamber by a separator membrane. Further in embodiments, the separator membrane may have a coating containing a catalyst on a surface thereof. Further in embodiments, the rebalancing system may further include a hydrogen gas inlet in communication with the anode chamber, a redox flow battery negative electrolyte inlet in communication with the cathode chamber so as to allow a negative electrolyte to be flowed through the cathode chamber, the negative electrolyte containing $Cr^{3+}$ ions and $Cr^{2+}$ ions, a power supply having a first terminal and a second terminal. Further in embodiments, the first terminal may be connected to a first conductive element in the cathode chamber and the second terminal connected to a second conductive element in the anode chamber of the electrochemical reaction cell. Further in embodiments, the rebalancing system may further include a controller configured to control a first flow of the negative electrolyte into the cathode chamber through the negative electrolyte inlet at a first rate, and configured to control a second flow of hydrogen gas into the anode chamber through the hydrogen gas inlet at a second rate, and configured to control the application of an electric current from the power supply to the first and second terminals. Further in embodiments, the first rate, the second rate and the applied electric current may be controlled so as to cause $Cr^{3+}$ ions to be reduced to $Cr^{2+}$ ions at one of: a controlled rate for a controlled period of time; or until a quantity of $Cr^{2+}$ ions exceeds a threshold quantity. Further in embodiments, the negative electrolyte may not contain $Fe^{3+}$ ions. Further in embodiments, the second flow of hydrogen gas into the anode chamber through the hydrogen gas inlet may be controlled at the second rate, the second flow of hydrogen gas interacting with the catalyst coating so as to cause $H^+$ ions to be generated at a third rate. Further in embodiments, the first rate, the second rate, the third rate and the applied electric current may be controlled so at to cause the $Cr^{3+}$ ions to be reduced to $Cr^{2+}$ ions at the controlled rate by reaction with $H^+$ ions entering the cathode chamber through the separator from the anode chamber at the third rate. Further in embodiments, the catalyst coating may include platinum. Further in embodiments, the catalyst coating may include at least one member of the group consisting of tungsten carbide, palladium, platinum alloy, and rhodium. Further in embodiments, the separator membrane may include a cation exchange membrane. Further in embodiments, the redox flow battery negative electrolyte inlet may be coupled to a source of negative electrolyte at a low state-of-charge. Further in embodiments, the low state-of-charge negative electrolyte may be at a state of oxidation of less than 50%. Further in embodiments, a rebalancing system may further comprise at least a second electrochemical reaction cell, wherein the first and second electrochemical reaction cells are configured in a bipolar stack arrangement. Further in embodiments, the hydrogen gas inlet may be coupled to a source of hydrogen gas captured from a redox flow battery. Further in embodiments, the hydrogen gas inlet may be coupled to a tank of hydrogen gas. Further in embodiments, the anode chamber may further be configured with no outlet for the inlet of hydrogen gas and may further be configured to accumulate excess hydrogen gas therein. Further in embodiments, the anode chamber may further comprise an outlet that vents excess hydrogen gas. Further in embodiments, the anode chamber may further comprise an outlet coupled to a source of hydrogen gas, and the hydrogen gas may continuously recirculate between the source of hydrogen gas and the anode chamber.

In further embodiments a redox flow battery system may utilize a positive electrolyte in a first half-cell chamber with a positive electrical polarity and a negative electrolyte in a second half-cell chamber with a negative electrical polarity, and ions may be exchanged through a first separator membrane separating the first half-cell chamber from the second half-cell chamber. Further in embodiments, a redox flow battery system may comprise a rebalancing system configured to adjust a charge balance between a positive electrolyte and a negative electrolyte in a redox flow battery system. Further in embodiments, a rebalancing system may comprise an electrochemical reaction cell comprising a cathode chamber and an anode chamber separated from the cathode chamber by a second separator membrane, the second separator membrane having a coating on a surface thereof, the coating containing a catalyst. Further in embodiments, a rebalancing system may further comprise a hydrogen gas inlet in communication with the anode chamber, a redox flow battery negative electrolyte inlet in communication with the cathode chamber so as to allow the negative electrolyte to be flowed through the cathode chamber, a power supply having a first terminal and a second terminal, the first terminal connected to a first conductive element in the cathode chamber and the second terminal connected to a second conductive element in the anode chamber of the electrochemical reaction cell, and a controller configured to control a first flow of the negative electrolyte into the cathode chamber through the negative electrolyte inlet at a first rate, and configured to control a second flow of hydrogen gas into the anode chamber through the hydrogen gas inlet at a second rate, and configured to control the application of an electric current from the power supply to the first and second terminals. Further in embodiments, the first rate, the second rate and the applied electric current may be controlled so as to cause a first ionic species in the negative electrolyte to be reduced to a second ionic species at one of: a controlled rate for a controlled period of time; or until a quantity of the second ionic species exceeds a threshold quantity. Further in embodiments, the negative electrolyte may not contain charged positive reactant ions. Further in embodiments, the negative electrolyte may contain $V^{3+}$ ions and $V^{2+}$ ions. Further in embodiments, the second flow of hydrogen gas into the anode chamber through the hydrogen gas inlet may be controlled at the second rate, the second flow of hydrogen gas interacting with the catalyst coating so as to cause $H^+$ ions to be generated at a third rate. Further in embodiments, the first rate, the second rate, the third rate and the applied electric current are controlled so at to cause the $V^{3+}$ ions to be reduced to $V^{2+}$ ions at the controlled rate by reaction with $H^+$ ions entering the cathode chamber through the separator from the anode chamber at the third rate. Further in embodiments, the catalyst coating may include platinum. Further in embodiments, the catalyst coating may include at least one member of the group consisting of tungsten carbide, palladium, platinum alloy, and rhodium. Further in embodiments, the separator membrane may include a cation exchange membrane. Further in embodiments, the redox flow battery inlet may be coupled to a source of negative electrolyte at a low state-of-charge. Further in embodiments, the low state-of-charge negative electrolyte may be at a state of oxidation of less than 50%.

A further embodiment method of rebalancing Fe/Cr redox flow battery electrolytes may comprise directing a negative electrolyte solution containing $Cr^{3+}$ ions and $Cr^{2+}$ ions through a cathode chamber of a rebalance cell, the cathode chamber having a first electrode, directing a quantity of hydrogen gas through a anode chamber of the rebalance cell, the anode chamber having a second electrode and being separated from the cathode chamber by a separator membrane having a catalyst-containing coating on a surface facing the anode chamber, and applying an electric current to the rebalance cell, the quantity of hydrogen gas and the current applied to the rebalance cell controlled so as to reduce at least some of the $Cr^{3+}$ ions to $Cr^{2+}$ ions according to a controlled reaction rate for a controlled period of time to rebalance the negative electrolyte solution. Further in embodiments, the catalyst-containing coating may include platinum. Further in embodiments, the catalyst-containing coating may include a member of the group consisting of tungsten carbide, palladium, platinum alloy, and rhodium. Further in embodiments, the separator membrane may include a cation exchange membrane. Further in embodiments, the negative electrolyte solution directed into the first chamber may be at a low state of charge. Further in embodiments, the low state-of-charge negative electrolyte solution may be at a state of oxidation of less than 50% prior to being directed into the first chamber. Further embodiment methods may comprise directing the negative electrolyte solution out of the first chamber and into a redox flow battery charging stack. Further embodiment methods may comprise directing negative electrolyte and hydrogen gas through respective cathode and anode chambers of at least a second electrochemical reaction cell that is combined with the first electrochemical reaction cell in a bipolar stack arrangement.

In further embodiments, a rebalancing system for use in a redox flow battery system may comprise an electrochemical reaction cell comprising a cathode chamber, an anode chamber, and a gas diffusion chamber sandwiched between the cathode chamber and the anode chamber, a first separator membrane separating the cathode chamber and the gas diffusion chamber, the separator membrane having a first catalyst coating on a side facing the gas diffusion chamber, a second separator membrane separating the anode chamber and the gas diffusion chamber, the second separator having a second catalyst coating on a side facing the gas diffusion chamber and a third catalyst coating on a side facing the anode chamber, an acid solution inlet in communication with the anode chamber to provide an acid solution to the anode chamber, a redox flow battery electrolyte inlet in communication with the cathode chamber to receive an electrolyte from the redox flow battery system, a power supply having a first terminal and a second terminal, the first terminal connected to a first conductive element in the cathode chamber and the second terminal connected to a second conductive element in the anode chamber, the power supply supplying an electric current between the first conductive element and the second conductive element, the electric current controlling one or more reactions in the anode chamber, the gas diffusion chamber and the cathode chamber to rebalance the electrolyte. Further in embodiments, at least one of the first catalyst coating, the second catalyst coating and the third catalyst coating may include platinum. Further in embodiments, at least one of the first catalyst coating, the second catalyst coating and the third catalyst coating may include a member of the group consisting of tungsten carbide, palladium, platinum alloy, and rhodium. Further in embodiments, the first and second separator membranes may include cation exchange membranes. Further in embodiments, the redox flow battery electrolyte inlet may be coupled to a source of a negative electrolyte at a low state-of-charge. Further in embodiments, the low state-of-charge negative electrolyte may be at a state of oxidation of less than 50%. In further embodiments, a rebalancing system may further comprise at least a second electrochemical reaction cell wherein the first and the at least a second electrochemical reaction cells are configured in a bipolar stack arrangement. Further in embodiments, a rebalancing system may further comprise a hydrogen gas conduit coupled to the gas diffusion chamber and supplying hydrogen gas captured from a redox flow battery into the gas diffusion chamber.

In further embodiments, a rebalancing system may be configured to reduce dissolution of a catalyst in a flow battery electrolyte and may comprise a first electrochemical reaction cell comprising a first cathode portion and a first anode portion separated from the first cathode portion by a first separator membrane, a second electrochemical reaction cell comprising a second cathode portion and a second anode portion separated from the second cathode portion by a second separator membrane comprising a coating of the catalyst on at least a portion of a surface facing the second anode, a flow battery electrolyte inlet in communication with the first cathode portion, a mediator solution channel communicating with the first anode portion of the first cell and the second cathode portion of the second cell capable of carrying a mediator solution, a hydrogen gas inlet in communication with the second anode portion of the second cell, wherein a rate at which a portion of the catalyst dissolved from the coating during operation of the second electrochemical cell migrates to the flow battery electrolyte in the first cathode portion is reduced using the mediator solution. Further in embodiments, the catalyst may include platinum. Further in embodiments, the catalyst may include a member of the group consisting of tungsten carbide, palladium, platinum alloy, and rhodium. Further in embodiments, the first anode portion of the first electrochemical cell and the second cathode portion of the second electrochemical cell are joined to form a middle-chamber. Further in embodiments, a rebalancing system may further comprise a three-position switch that may be switchable between a first position connecting a first conductor in contact with the first cathode portion to a second conductor in contact with the middle chamber, a second position connecting a third conductor in contact with the second anode portion to the second conductor in contact with the middle chamber, and a third position in which the first conductor, the second conductor and the third conductor are open. Further in embodiments, the first anode portion of the first cell and the second cathode portion of the second cell are separate. Further in embodiments, a rebalancing system may further comprise an electrical circuit having a first line connecting the first cathode portion of the first cell to the second anode portion of the second cell, a second line connecting the first anode portion of the first cell to the second cathode portion of the second cell, and a resistor connecting the first line to the second line. Further in embodiments, the mediator solution may be circulated between the first anode portion of the first cell and the second cathode portion of the second cell. Further in embodiments, the flow battery electrolyte may include a positive electrolyte containing excess $Fe^{3+}$ ions. Further in embodiments, the flow battery electrolyte may include a negative electrolyte containing excess $Cr^{3+}$ ions. Further in embodiments, the mediator solution may have an elemental composition that is identical to the flow battery electrolyte. Further in embodiments, both the mediator solution and the flow battery electrolyte may include Fe ions and Cr ions.

A further embodiment method of rebalancing a flow battery electrolyte may comprise directing a flow battery electrolyte into a cathode portion of a first electrochemical reaction cell, directing hydrogen gas into an anode portion of a second electrochemical reaction cell, a separator membrane of the second electrochemical reaction cell having a catalyst material on at least a portion of a surface facing the anode portion of the second electrochemical reaction cell, providing a mediator solution in contact with an anode portion of the first electrochemical reaction cell and a cathode portion of the second electrochemical reaction cell. An embodiment method may further comprise monitoring a concentration of the catalyst material dissolved in the mediator solution. An embodiment method may further comprise determining that the mediator solution contains a concentration of the catalyst material above a threshold amount, and replacing the mediator solution. An embodiment method may further comprise determining that the mediator solution contains a concentration of the catalyst material above a threshold amount, directing a quantity of the mediator solution through a mediator cleaning cell, and plating the catalyst material to an electrode in the mediator cleaning cell.

Further embodiments may include a non-transitory computer readable medium having instructions stored thereon which, when executed by a processor in a flow battery electrolyte rebalancing system, cause the processor to perform operations that may comprise controlling the transfer of an electrolyte associated with the flow battery electrolyte rebalancing system into a cathode portion of a first electrochemical reaction cell, and controlling the transfer of hydrogen gas into an anode portion of a second electrochemical reaction cell comprising a separator membrane with a catalyst disposed on at least a portion thereof on a surface of the separator membrane facing the anode portion of the second electrochemical reaction cell. In further embodiments, a mediator solution may be provided in contact with an anode portion of the first electrochemical reaction cell and a cathode portion of the second electrochemical reaction cell. An embodiment non-transitory computer readable medium may have further instructions stored thereon which, when executed by the processor, causes the processor to perform further operations that may comprise monitoring a concentration of the catalyst dissolved in the mediator solution. An embodiment non-transitory computer readable medium may have further instructions stored thereon which, when executed by the processor, causes the processor to perform further operations that may comprise determining that the mediator solution contains a concentration of the catalyst above a threshold amount, and controlling the replacement of the mediator solution. An embodiment non-transitory computer readable medium may have further instructions stored thereon which, when executed by the processor, causes the processor to perform further operations that may comprise determining that the mediator solution contains a concentration of the catalyst above a threshold amount, controlling the transfer of a quantity of the mediator solution to a mediator cleaning cell, and controlling the plating of the catalyst to an electrode in the mediator cleaning cell.

A further embodiment redox flow battery system may comprise a first electric power source, an electric load, a flow battery reaction stack coupled to the electric load and the electric power source. Further in embodiments, the flow battery reaction stack may comprise a plurality of electrochemical reaction cells in a bipolar stack configuration, each of the electrochemical reaction cells comprising a positive half-cell and a negative half-cell, a positive electrolyte flow path in fluid communication with the positive half-cells of the electrochemical reaction cells of the flow battery reaction stack, a negative electrolyte flow path in fluid communication with the negative half-cells of the electrochemical reaction cells of the flow battery reaction stack, a rebalance stack coupled to the flow battery reaction stack. Further in embodiments, the rebalance stack may comprise a plurality of rebalance reaction cells. Further in embodiments, each rebalance reaction cell may comprise a rebalance cathode chamber and a rebalance anode chamber separated from the rebalance cathode chamber by a separator membrane with a catalyst coating on a surface thereof, a hydrogen gas inlet in communication with the rebalance anode chamber. Further in embodiments, the negative electrolyte flow path may be in fluid communication with the rebalance cathode chambers of the rebalance stack so as to allow the negative electrolyte to be flowed through the rebalance cathode chamber, the negative electrolyte containing a quantity of $Cr^{3+}$ ions. Further in embodiments, the flow battery reaction stack may further comprise a second electric power source coupled to the rebalance stack. Further in embodiments, the second electric power source may have a first terminal and a second terminal, the first terminal connected to a first conductive element in the rebalance cathode chamber and the second terminal connected to a second conductive element in the rebalance anode chamber of each of the plurality of rebalance reaction cells. Further in embodiments, the flow battery reaction stack may further comprise a controller configured with instructions configured to cause the controller to perform operations that may comprise controlling a first flow of the negative electrolyte into each of the cathode chambers of the plurality of rebalance reaction cells at a first rate, controlling a second flow of hydrogen gas into each of the anode chambers of the plurality of rebalance reaction cells at a second rate, and controlling an electric current from the second electric power source to the first and second terminals. Further in embodiments, the first rate, the second rate and the electric current may be controlled so as to cause $Cr^{3+}$ ions to be reduced to $Cr^{2+}$ ions at a controlled rate or until at least a target quantity of $Cr^{2+}$ ions is present in the negative electrolyte. Further in embodiments, the positive electrolyte comprises $Fe^{2+}$ ions and $Fe^{3+}$ ions and the negative electrolyte may comprise $Cr^{2+}$ ions and $Cr^{3+}$ ions. Further in embodiments, the positive electrolyte may comprise $Cr^{3+}$ ions and the negative electrolyte comprises $Fe^{2+}$ ions. Further in embodiments, the positive electrolyte and the negative electrolyte may comprise more total Cr than total Fe. Further in embodiments, the second electric power source may be coupled to the electric power source. Further in embodiments, the second electric power source may no bet coupled to the electric power source. Further in embodiments, the second electric power source may be the same as the first electric power source.

An embodiment non-transitory computer readable medium may have instructions stored thereon, the instructions, when read and executed by a processor for rebalancing Fe/Cr redox flow battery electrolytes, may be configured to cause the processor to perform operations that may comprise directing a negative electrolyte solution containing excess $Cr^{3+}$ ions through a cathode chamber of a rebalance cell, the cathode chamber having a first electrode, directing a quantity of hydrogen gas through an anode chamber of the rebalance cell, the anode chamber having a second electrode and being separated from the cathode chamber by a separator membrane having a catalyst coating on a surface facing the anode chamber, and applying an electric current to the rebalance cell, the quantity of hydrogen gas and the current applied to the rebalance cell controlled so as to reduce at least some of the $Cr^{3+}$ ions to $Cr^{2+}$ ions according to a controlled reaction rate for a controlled period of time to rebalance the negative electrolyte solution. Further in embodiments, the catalyst coating may include platinum. Further in embodiments, the catalyst coating may include a member of the group consisting of tungsten carbide, palladium, platinum alloy, and rhodium. Further in embodiments, the separator membrane may include a cation exchange membrane. Further in embodiments, the negative electrolyte solution may be directed into the first chamber is at a low state of charge. Further in embodiments, the low state-of-charge negative electrolyte solution may be at a state of oxidation of less than 50% prior to being directed into the first chamber. In a further embodiment non-transitory computer-readable medium, the instructions, when read and executed by the processor, may be configured to cause the processor to perform operations that may further comprise directing the negative electrolyte solution out of the first chamber and into a redox flow battery charging stack. In a further embodiment non-transitory computer-readable medium, the instructions, when read and executed by the processor, may be configured to cause the processor to perform operations that may further comprise directing negative electrolyte and hydrogen gas through respective cathode and anode chambers of at least a second electrochemical reaction cell that is combined with the first electrochemical reaction cell in a bipolar stack arrangement.

BRIEF DESCRIPTION OF THE DRAWINGS

The novel features of the invention are set forth with particularity in the claims that follow. A better understanding of the features and advantages of the systems and methods herein will be obtained by reference to the following detailed description that sets forth illustrative embodiments, in which the principles of the invention are utilized, and the accompanying drawings of which:

FIG. 8A, FIG. 8B and FIG. 8C are schematic diagrams illustrating exemplary embodiments for a three-chamber electrochemical system for electrolyte rebalancing.

FIG. 12A and FIG. 12B are diagrams illustrating embodiments of an electrochemical system for electrolyte rebalancing having an integral hydrogen generator.

DETAILED DESCRIPTION

Figure 1:
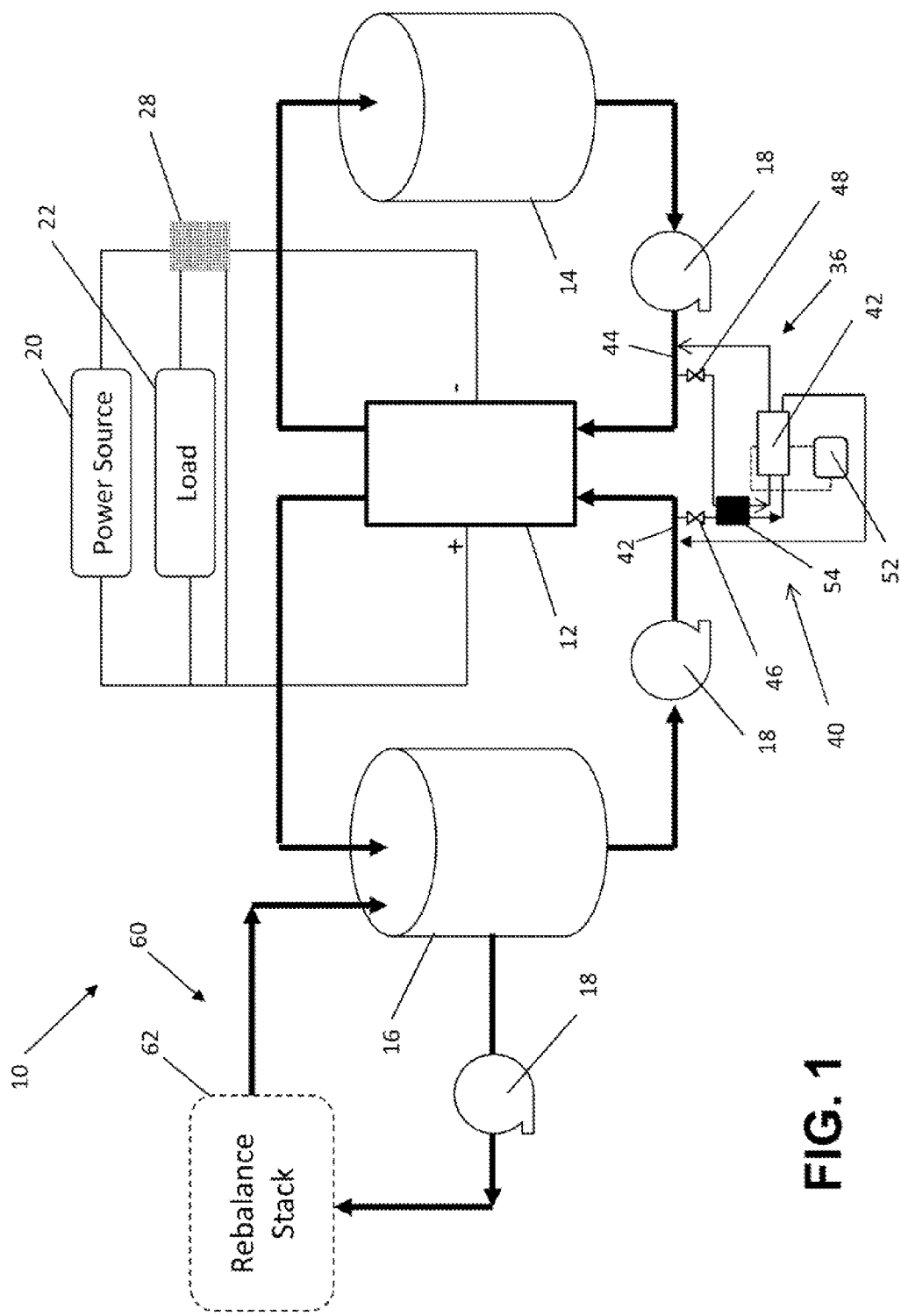
FIG. 1 is a schematic diagram illustrating an RFB system incorporating a system for rebalancing the RFB electrolyte in various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims. The embodiments below include systems and methods for correcting imbalances in the reaction stoichiometry of a redox flow battery (RFB) using rebalancing systems that utilize one or more catalysts while preventing contamination of flow battery electrolytes from the catalyst(s). Although many of the embodiments are described with reference to Fe/Cr flow batteries, the same principles and concepts may also be applied to other RFB chemistries and to other catalyst materials beyond those explicitly described in the various examples below.

Certain terms that are used throughout the application are explained here. Other terms that appear less frequently are explained as they arise.

As used herein, the terms "about" or "approximately" for any numerical values or ranges indicates a suitable temperature or dimensional tolerance that allows the part or collection of components to function for its intended purpose as described herein.

As used herein, references to "non-reactive materials" or "carbon" materials may be read as including any material that is known to be chemically inert or chemically non-reactive in the presence of the electrolyte compositions being used. Thus, for example, a "carbon felt electrode" material may include any electrically conductive material through which a gas or liquid may flow, preferably without chemically or electrochemically reacting with the flowing liquid or gas.

Unless otherwise specified, terms like anode, cathode, anolyte, and catholyte are used herein as if the battery were always in a discharge mode. Hence, the terms "anolyte" and "negative electrolyte" will refer to the electrolyte in contact with the negative electrode of an electrochemical reaction cell and the terms "catholyte" and "positive electrolyte" will refer to the electrolyte in contact with the positive electrode of an electrochemical reaction cell. However, as will be clear to the skilled artisan, the electrodes where anodic (electrochemical oxidation) and cathodic (electrochemical reduction) reactions take place are reversed during charge and discharge processes. For example, the negative electrode of an RFB acts as the cathode during battery charging and as the anode during battery discharging.

The energy produced or consumed by an electrochemical cell can be expressed as the product of cell voltage, current and time (Joules=Volts×Amps×Seconds). Energy losses within the cell can arise from two distinct effects, known as "Voltage efficiency" and "Faradaic efficiency".

Voltage efficiency of a flow battery may be defined as the ratio of average voltage during discharging to the average voltage during charging. Under this definition, voltage efficiency will tend to be less than 100% due to various factors. For example, both the anode (i.e., the electrode at which oxidation is occurring) and the cathode (i.e., the electrode at which reduction is occurring) require an electrochemical kinetics overpotential, which is an extra potential in excess of the thermodynamic reversible potential that must be applied to keep electric current flowing at a desirable rate. Voltage efficiency may also be reduced by electrical resistance of the electrolyte—which conducts ions—and the electrical resistance of the electrodes, current collectors, wires, etc.—which conduct electrons.

As used herein, the term "Faradaic efficiency" may refer to the ratio of the amount of charge (in coulombs) received during discharge to the amount of charge used during charge. Typically, more coulombs are used during charge than are obtained during discharge. Faradic efficiency may be reduced below 100% by multiple causes. For example, mixing of positive and negative electrolytes due to diffusion and migration of ions across the separator may cause reduced Faradic efficiency. Parasitic side reactions are another source of Faradic efficiency losses. For example, in some RFBs, the charging process can drive the potential of the negative electrode low enough to initiate hydrogen evolution via the electrode reaction:

$$2H^+ + 2e^- = H_2 \quad\quad\quad EQ(1)$$

All of the charge consumed in parasitic reactions subtracts directly from the usable charge stored by the battery.

As used herein, the phrase "state of charge" and its abbreviation "SOC" refer to the ratio of stored electrical charge (measured in ampere-hour) to charge storage capacity of a complete RFB system. In particular, the terms "state of charge" and "SOC" may refer to an instantaneous ratio of usable charge stored in the RFB to the full theoretical charge storage capacity of the RFB system. In some embodiments, "usable" stored charge may refer to stored charge that may be delivered at or above a threshold voltage (e.g. about 0.7 V in some embodiments of an Fe/Cr RFB system). In some embodiments, the theoretical charge storage capacity may be calculated excluding the effects of unbalanced reaction stoichiometry.

As used herein the phrase "reaction stoichiometry" refers to the balance between the molar quantities of redox reactants in the two electrolytes of an RFB. For example, in the case of a charged Fe/Cr RFB, where the net discharge reaction is:

$$Fe^{3+} + Cr^{2+} = Fe^{2+} + Cr^{3+} \quad\quad\quad EQ(2)$$

the reaction stoichiometry is perfectly balanced when the number of moles of charged reactant ($Fe^{3+}$) in the positive electrolyte is equal to the number of moles of charged reactant ($Cr^{2+}$) in the negative electrolyte. The quantitative reaction stoichiometry may be expressed herein in terms of the "state of oxidation" of each electrolyte.

As used herein the phrase "state of oxidation" and its abbreviation "SOO" refer to the chemical species composition of at least one liquid electrolyte. In particular, state of oxidation and SOO may refer to the proportion of reactants in the electrolyte that have been converted (e.g. oxidized or reduced) to a "charged" state from a "discharged" state. For example, in an RFB based on an Fe/Cr redox couple, the state of oxidation of the catholyte (positive electrolyte) may be defined as the percent of total Fe which has been oxidized from the $Fe^{2+}$ form to the $Fe^{3+}$ form (i.e., $[Fe^{3+}]/[Fe_{total}]$), and the state of oxidation of the anolyte (negative electrolyte) may be defined as the percent of total Cr which has been reduced from the $Cr^{3+}$ form to the $Cr^{2+}$ form (i.e., $[Cr^{2+}]/[Cr_{total}]$).

Alternatively, SOO may be expressed as a molar concentration (e.g., indicated as #.# M herein) of a charged reactant species (i.e., only the numerator of the ratios described above). In such cases, the SOO of the negative electrolyte may be given a negative sign, and the SOO of the positive electrolyte may be given a positive sign. In such cases, the sum of the negative electrolyte SOO and the positive electrolyte SOO may be equal to an electrolyte imbalance. Electrolytes may be described as un-balanced or as having an imbalance when a quantity of a charged active material in one electrolyte is greater than the quantity of the active material in the second electrolyte. For example, a positive imbalance exists between two flow battery electrolytes when the positive electrolyte contains a greater quantity of charged active material than a quantity of charged active material in the negative electrolyte. On the other hand, a negative imbalance exists between two flow battery electrolytes when the negative electrolyte contains a greater quantity of charged active material than a quantity of charged active material in the positive electrolyte.

Although many of the embodiments herein are described with reference to an Fe/Cr RFB chemistry, it should be appreciated with the benefit of the present disclosure that some embodiments are applicable to RFB systems (and some hybrid flow battery systems) using other reactants. For example, some known alternative RFB chemistries include: all vanadium (V/V), iron-vanadium (Fe/V), hydrogen bromine (H/Br), tin-iron (Sn/Fe), vanadium cerium (V/Ce), vanadium-polyhalide (V/Br2), iron-bromine (Fe/Br2), titanium-iron (Ti/Fe), iron-ethylenediaminetetraacetic acid-bromine (Fe-EDTA/Br), zinc-cerium (Zn/Ce), zinc-bromine (Zn/Br), and bromine polysulfide (S/Br2).

In some embodiments, the state of oxidation of the two electrolytes may be changed or measured independently of one another. Thus, the terms "state of oxidation" and "SOO" may refer to the chemical composition of only one electrolyte, or of both electrolytes in an all-liquid RFB system. The state of oxidation of one or both electrolytes may also be changed by processes other than the desired charging or discharging reactions. For example, undesired (or "parasitic") side reactions may cause oxidation or reduction of active species in one electrolyte without producing a corresponding reaction in the second electrolyte. Such side reactions may cause the respective SOOs of the positive and negative electrolytes to become unbalanced such that one electrolyte has a higher effective SOO than the other. The SOO of one or both electrolytes may also be changed by a rebalancing process.

RFB Systems and Components

FIG. 1 illustrates a typical RFB system 10 comprising an electrochemical stack 12 which may be configured to charge, that is, to convert electrical energy from an electric power source 20 into chemical potential energy in liquid electrolytes flowed through the stack 12 by pumps 18 and stored in tanks 16, 14 containing negative electrolyte (anolyte) and positive electrolyte (catholyte). The stack 12 may also be configured to discharge, that is, to convert chemical potential energy into electric power for delivery to an electric load 22.

In some embodiments an electronic control system 28 may control the switching of charging from a source and discharging to a load, as well as controlling the operational mode of the battery or power source 20, the operation of pumps 18, valves, and sub-systems such as a rebalancing system 60, an electrolyte concentration monitoring system 40, power conditioning systems, etc. The electronic control system 28 may be configured to control any other battery system or peripheral functions as needed. In some embodiments, the stack 12 may comprise a plurality of individual electrochemical reaction cells (or blocks of cells) joined hydraulically and electrically in parallel and/or series combinations in order to meet application requirements. Examples of such stacks are shown and described in U.S. Pat. No. 7,820,321, US Patent Application Publication 2011/0223450 and US Patent Application Publication 2011/0117411 all of which are incorporated by reference herein. The above identified patents and publications disclose various aspects including exemplary electrochemical stack assembly or assemblies of redox cells. Any references to "a cell" or "cells" herein are not limited to any specific number of cells, and may include any number of RFB reaction cells or blocks of multiple cells in any arrangement.

Each flow battery cell may include a positive flow-through electrode in a positive electrode chamber, a negative flow-through electrode in a negative electrode chamber, and a separator membrane separating the positive electrode chamber from the negative electrode chamber. In various embodiments, flow-through electrodes may be replaced with solid "flow-by" electrodes configured to contact a liquid or gaseous reactant on only a solid surface. Still other electrode configurations may also be used, such as solid structures with holes, voids, ridges, channels, or other structures that may be contacted by liquid or gaseous reactants flowing over, through or around such structures.

In some embodiments, a RFB system 10 may incorporate an electrolyte concentration monitoring system 40 for detecting an electrolyte imbalance. Various embodiments of flow-battery-integrated concentration or imbalance monitoring systems may be configured with various fluid delivery arrangements such as by allowing inlet and outlet to the monitoring system through the operation of valves 46, 48 and an optional mixing chamber 54, a test cell 42 and a control element 52 making up a subsystem 36. One example of an electrolyte monitoring system is described in co-pending U.S. patent application Ser. No. 13/432,243 entitled "Monitoring Electrolyte Concentrations in Flow Battery Systems" (referred to herein as "the '243 application"), incorporated by reference herein. The above identified patents and publications disclose various aspects including techniques for monitoring reactant concentrations by measuring properties such as redox potential, refractive index, density, concentration by spectroscopy or various combinations of techniques and for aspects of exemplary test cell structures, coulometric monitoring, chrono-potentiometry, and control processes. Other electrolyte monitoring systems are described below, and yet others are known to those skilled in the art.

In some embodiments, an RFB system may comprise an integral rebalancing system 60 joined in fluid communication with one or more electrolyte tanks, with the stack 12, or with another portion of the RFB system. Such a rebalancing system 60 may include a rebalance stack 62 which may comprise one or more reaction cells configured to perform a rebalancing process (such as any of the processes described below). In some cases, the rebalance system 60 may also comprise a controller (not shown) that is separate from the flow battery system controller 28. In some embodiments, a rebalance system controller may be configured to communicate with the flow battery system controller by any suitable wireless or wired digital communication protocol. In some embodiments, the rebalance system 60 may be joined to a positive electrolyte tank, for example, through an inlet.

In some embodiments, the rebalance system 60 may be joined to a negative electrolyte tank, for example, through an inlet or to both positive and negative electrolyte tanks, for example, through respective inlets. In some embodiments, as shown for example in FIG. 1, a rebalance system may be configured to draw electrolyte from a tank, perform a rebalancing process and then return the rebalanced electrolyte to the tank. In alternative embodiments, the rebalance system may be positioned and configured to withdraw electrolyte from the tank, and then return the electrolyte directly into an electrolyte conduit directing the electrolyte into the stack 12 before returning to a storage tank, for example through an outlet. In still further embodiments, the rebalance system 60 may be configured to withdraw electrolyte from the stack 12 and return the rebalanced electrolyte to either the stack 12 or to one of the tanks 14, 16.

In some embodiments, the stack 12 may comprise a plurality of cell blocks joined to one another in a cascade arrangement such that electrolyte flows in fluidic series from one cell to another or from one cell block to another. For example, the '321 patent referenced above describes embodiments of engineered cascade RFB systems in which cells and/or stacks are arranged in cascade orientations, such that electrolyte flows in series from a first stage to an nth stage (where n is any number greater than one) along a common flow path. In those engineered cascade systems, a state-of-charge gradient exists between the first stage and the nth stage, and components of the electrochemical cells may be optimized based on the state-of-charge conditions expected at those cells. Such systems provide for improved overall energy efficiency relative to cascade stacks in which all cells are configured the same.

Although the RFB system of FIG. 1 is shown with two tanks, the systems and processes below may also be used in four-tank systems. In some embodiments, the benefits of a four-tank system may be achieved by using two tanks, each having a divider or separator. Examples of RFB systems with divided tanks are shown and described in U.S. Pat. No. 7,820,321 incorporated herein above, and herein for the additional purpose of various aspects including four-tank systems and two-tank systems with tank separators that allow charged and discharged electrolytes to be stored in the same tank using tank separators that prevent or at least inhibit mixing of charged and discharged electrolyte.

Flow Battery Electrolytes

Flow battery electrolytes are typically made by dissolving precursors for electrochemical reaction active materials, such as particular compounds of iron, chromium, vanadium, titanium, bromine, zinc, etc. in an aqueous acid solution. Strong acids are typically used as supporting electrolytes because the superior mobility of $H^+$ ions over other ions increases the conductivity of the electrolyte and thus the ability of the cell to generate higher current densities. In some embodiments, "mixed reactant" RFB electrolytes may be formulated such that both positive and negative electrolytes are identical in a fully discharged form. In such embodiments, a single electrolyte solution may be prepared with both discharged active species.

Thus for example, in some RFB systems based on the Iron/Chromium (Fe/Cr) redox couple, the catholyte (positive electrolyte) may contain $FeCl_3$ and $FeCl_2$ dissolved in a supporting electrolyte. The anolyte (negative electrolyte) may contain $CrCl_3$ and $CrCl_2$ in a supporting electrolyte. Such a system is known as an "un-mixed reactant" system. In a "mixed reactant" system, the anolyte may also contain $FeCl_2$, and the catholyte may also contain $CrCl_3$. Mixed reactant electrolytes generally have the property that the fully discharged form of the positive electrolyte has the same composition as the fully discharged form of the negative electrolyte. Advantages of mixed reactant electrolytes may include slower diffusion of redox species between positive and negative electrolytes, and simpler handling of discharged electrolytes, including the need to manufacture only one electrolyte composition.

In some such embodiments, an unequal mixed reactant electrolyte may be prepared with a higher concentration of total Cr than total Fe. One reason for preparing a mixed electrolyte with higher Cr concentration is to mitigate the generation of $H_2$. In other cases, an electrolyte with a greater quantity of total Cr than total Fe may be provided in order to allow for the positive and negative electrolytes to be maintained at a negative imbalance (as defined below) without reducing energy storage capacity of the RFB. In various embodiments, the quantity of Cr in the electrolyte may exceed the quantity of Fe in the electrolyte by about 1%, by between about 7% and about 9% or by up to 20% or more.

If charge and discharge reactions were perfectly reversible, the electrolytes would always be in balance, meaning that the quantity of charged active material in the catholyte (e.g., $Fe^{3+}$) would be stoichiometrically equivalent to the quantity of charged active material in the anolyte (e.g., $Cr^{2+}$). In practice, parasitic side reactions such as hydrogen evolution may consume some of the charge intended for the reduction of $Cr^{3+}$ to $Cr^{2+}$, causing the quantity of $Cr^{2+}$ in the anolyte to be lower than the quantity of $Fe^{3+}$ in the catholyte. In this state, the system is said to be unbalanced and the energy storage capacity of the battery is impaired. Furthermore, because the energy consumed in forming the excess $Fe^{3+}$ ions cannot be recovered (since there is insufficient $Cr^{2+}$ for the excess $Fe^{3+}$ to react with), the energy efficiency of the system is also impaired.

In an Fe/Cr RFB system, a "positive electrolyte imbalance" refers to a condition in which the positive electrolyte contains a higher quantity of charged active material (e.g., $Fe^{3+}$) than the quantity of charged active material (e.g., $Cr^{2+}$) in the negative electrolyte. In other words, assuming reactants are present in the electrolytes in equal concentrations, the electrolytes are positively un-balanced if the |SOO| (absolute value of SOO) of the positive electrolyte is greater than the |SOO| of the negative electrolyte ($|SOO_{pos}|>|SOO_{neg}|$, assuming equal reactant concentrations). If reactant concentrations are substantially un-equal and if SOO is expressed as an absolute value percent of charged ions as described above, then a positive imbalance may exist even when the $SOO_{neg}>SOO_{pos}$.

The opposite condition is "negative electrolyte imbalance", referring to a higher charged active material quantity (e.g., $Cr^{2+}$) in the negative electrolyte than the quantity of charged active material (e.g., $Fe^{3+}$) in the positive electrolyte (i.e., $SOO_{neg}>SOO_{pos}$, assuming equal reactant concentrations). In the case of an Fe/Cr RFB (and many others), positive electrolyte imbalance occurs naturally because of side reactions such as the generation of hydrogen gas at the negative electrode. In contrast, negative imbalance typically only occurs as a result of rebalancing of one or both electrolytes past a point of perfect balance, or by some other directed action.

In various embodiments, the degree and/or direction (positive or negative) of any electrolyte imbalance may be monitored or measured using any suitable method. For example, imbalance may be characterized and quantified using a specially-configured small-volume test cell and/or a reference electrode as described in more detail in the '243 application incorporated herein above and herein for the additional purpose of various aspects including an exemplary test cell with small electrolyte volumes on the order of less than about 1 mL or around 0.8 mL in some embodiments or larger or smaller. The small volume of the test cell electrolyte chambers allows measurement time to be shortened. In other embodiments, the concentrations of active materials in one or both electrolytes may be measured using spectroscopic methods well understood by those skilled in the art.

As used herein, the terms "catalyst" and "catalytic material" refer to substances that accelerate desired chemical or electrochemical reactions and/or suppress undesired chemical or electrochemical reactions. The catalysts may be solid materials that are plated, coated or otherwise deposited on the surface of an electrode or other structure within a cell. Alternatively, catalysts may be soluble or colloidal species that are dissolved or suspended in an electrolyte.

Bismuth metal plated on negative RFB electrodes has been used as a reaction catalyst and as a hydrogen generation suppressor. In other embodiments, catalyst materials may be coated or plated onto the surface of one or both electrodes. The composition and quantity of such catalyst materials may vary depending on the needs of a particular RFB system. In addition to bismuth, RFB catalyst materials may include, gold, lead, silver, titanium, tungsten carbide, zirconium carbide, or other carbide and nitride compounds. For example, U.S. Pat. No. 4,543,302 describes a method of coating the negative electrode of a RFB cell with bismuth (Bi), U.S. Pat. No. 4,270,984 teaches a method of coating the negative electrode surface of a RFB cell with lead (Pb), and U.S. Pat. No. 4,882,241 teaches a method of coating the negative electrode of a RFB cell with a combination of Au, Ti, Pb, & Bi. Benefits conferred by the catalyst materials can be lost by chemical or electrochemical reactions that remove them from the electrode surface.

If the catalyst (such as Bi) is lost from the negative electrode, the cell may develop a higher resistance, and may generate more hydrogen. When an Fe/Cr flow battery system is left at open-circuit, it self-discharges. With balanced or positively un-balanced electrolytes, this self-discharge causes a loss of bismuth. In some cases, in order to prevent the loss of bismuth with a positive or zero electrolyte imbalance, either the cells may be continuously charged at a low current (i.e., a "trickle charge"), or the charged electrolytes may be pumped through the cells continuously at a low flow rate. Both of these methods are undesirable because they result in lower overall system efficiency due to the energy consumption required. If the catalyst (e.g., bismuth) is allowed to be deplated during an idling period, then a plating step must typically be done prior to any charge or discharge operation in order to re-establish a desired catalyst surface. This additional step introduces more complexity and long delay times.

Electrolyte Rebalancing

In order to bring the electrolytes into balance or to a desired stoichiometric relationship, one or both electrolytes may be processed to increase or decrease the concentration of the charged redox reactants in at least one electrolyte. For example, in order to rebalance an Fe/Cr RFB with a positive imbalance, either the $Fe^{3+}$ concentration may be decreased, or the $Cr^{2+}$ concentration may be increased.

As used herein, the term "rebalancing" may refer to adjusting a concentration of a charged active material in one or both electrolytes (e.g., using systems and methods such as the examples described herein) in order to bring the electrolytes into a more desired stoichiometric relationship, even if the desired stoichiometric relationship is not equal to zero imbalance. In some cases, such a desired stoichiometric relationship may be equivalent to a specific target value of electrolyte imbalance, such as zero imbalance. In other cases, a desired stoichiometric relationship may correspond with an imbalance state within a particular range. For example, a desired stoichiometric relationship may include an imbalance of between about +0.1M (molarity concentration) and about −0.1M. In other embodiments, a desired stoichiometric relationship may include an imbalance of between about 0 and about −0.2M. Therefore, "rebalancing" may include any process that brings electrolytes from an undesired level of imbalance to within a desired range of imbalance.

As described in Applicants' co-pending U.S. patent application Ser. No. 14/095,362 which is incorporated herein by reference in its entirety, in some embodiments loss of a catalyst during self-discharge may be prevented in many circumstances by maintaining Fe/Cr electrolytes at a negative electrolyte imbalance during operation of the flow battery. By operating an Fe/Cr flow battery at a negative imbalance, the bismuth plated onto the negative electrode may remain stable and even when the cell self-discharges to 0 V. As described above, under normal operating conditions, an Fe/Cr flow battery will tend to become positively imbalanced due to hydrogen generation and other side reactions. Thus, achieving and maintaining a negative imbalance may involve some additional processing.

In some embodiments, a desired stoichiometric relationship of flow battery electrolytes may be achieved by performing a rebalancing operation on one or both electrolytes to reach a condition in which the negative electrolyte contains a higher concentration of charged active material (e.g., $Cr^{2+}$) than the charged active material concentration in the positive electrolyte (e.g., $Fe^{3+}$). Therefore, in some embodiments, rebalance processes including the examples provided herein may be used in order to maintain electrolytes in a negatively imbalanced state during operation of a flow battery.

Alternatively, a desired stoichiometric relationship of flow battery electrolytes may be achieved by performing a rebalancing operation on one or both electrolytes to reach a condition in which the electrolytes are within a particular range of imbalance such that a ratio of charged active material in the negative electrolyte (e.g., $Cr^{2+}$) to the charged active material concentration in the positive electrolyte (e.g., $Fe^{3+}$) is within a desired range. Therefore, in some embodiments, rebalance processes including the examples provided herein may be used in order to maintain electrolytes within a desired range of imbalance during operation of a flow battery.

In various embodiments, a rebalancing process may be initiated when an electrolyte imbalance is believed to be at an undesired level. In some cases such an undesired imbalance level may be detected using an imbalance monitoring method or device, some examples of which are described above. In other embodiments, an undesired imbalance level may be assumed to exist at a particular time based on a known correlation between imbalance and another detectable or measurable operating factor such as a number of charge/discharge cycles or a duration of operation, or others.

In some embodiments, a rebalancing process may comprise detecting that an electrolyte imbalance may be at an undesired level and then initiating a rebalancing process to cause the imbalance to become closer to a desired level. The rebalancing process may continue treating one or both electrolytes until the electrolytes have an imbalance that is within a desired target range.

In some cases, depending on the rebalancing and/or imbalance measurement processes being used, a detected undesired imbalance level at which rebalancing is begun (i.e., a rebalance start point) and/or a desired imbalance at which rebalancing may be stopped (i.e., a rebalance stop point) may be selected to include an additional margin to account for measurement uncertainty and/or time lag between a measured imbalance (or a measured factor correlated with imbalance) and a range of possible actual imbalance values. In various embodiments, a range of imbalance to be maintained may be at least partly determined based on a known range of uncertainty in an imbalance measurement. For example, depending on the measurement method used, an electrolyte imbalance measurement may have an uncertainty of +/−0.01M or more. In such embodiments, it may be desirable to establish start and stop point values to maintain imbalance within a desired range even in the cases in which an imbalance measurement is inaccurate.

For example, if a measured imbalance value is known to have a maximum uncertainty or error (whether due to an imprecise measurement technique, time lag or any other cause) of +/−0.015 M, then in order to prevent a negative imbalance from becoming less negative than −0.01 M, a process may be started if the imbalance is measured to be −0.025 M. In some cases, if the rate at which imbalance becomes more positive during normal flow battery operation is such that the imbalance is likely to become substantially more positive before a new measurement can be obtained, it may be desirable to begin a rebalancing process at a negative imbalance of −0.03 M or even more negative. Similarly, if the flow battery is configured such that a maximum negative imbalance before losing capacity is −0.2M, then a rebalancing process may be stopped when a measured imbalance is −0.185 or more negative.

Some imbalance measurement processes may take a substantial amount of time to complete. For this and other reasons, it may be impractical to rely on a measurement process for precisely determining whether a desired "stop-point" has been reached. Therefore, in some cases a system may be configured to define a stop point in terms of time or a number of rebalance process cycles. For example, a time required to change an imbalance from a first value to a second value may be determined based on a known rebalance rate proceeding from a known imbalance point. For example, a known imbalance may be based on a measurement taken before or during a rebalance process. In some cases, a coulometric rebalance rate may be determined based on the known electrochemistry of the rebalance process. With a known coulometric rebalance rate, a new imbalance value may be estimated at any point during a rebalance process by measuring a quantity of coulombs delivered to a rebalance system. A coulomb is the SI quantity of electric charge equal to the quantity of electricity conveyed in one second by a current of one ampere. Therefore, by applying a known electric current to a known rebalance system (or other electrolyte processing system) for a known duration of time, a new imbalance value may be estimated from a measured starting point.

In some cases, a start point at which to begin a rebalancing process may be based on a number of charge/discharge cycles or a duration of operation instead of a measured imbalance value. For example, in some cases a rate at which side-reactions cause electrolyte imbalance to become more positive may be known, such as by observation from periodic measurements over many charge/discharge cycles or over a long period of operation (e.g., days, weeks, months or years). Thus, for example, if it is known based on observation of past performance of a particular flow battery system that the electrolytes tend to become more positively imbalanced at a rate of about 1% for each charge/discharge cycle during normal operation, then a process for making the imbalance more negative by at least 1% may be performed after every charge/discharge cycle. Alternately, a process to cause the electrolyte imbalance to become more negative by at least 5% may be performed every five charge/discharge cycles. Using this or other methods, the frequency and/or duration of rebalancing may be adjusted based on observed performance of a particular flow battery system.

In various embodiments, a target imbalance range may be at least partly based on an excess quantity of a negative reactant material. For example, as described in U.S. patent application Ser. No. 13/433,189, Fe/Cr flow battery electrolytes may be configured with an excess quantity of Cr in order to extend the charge capacity of a flow battery system in order to mitigate the effect of side reactions. In one example, an Fe/Cr flow battery may be configured with electrolytes containing 1.3M Fe and 1.5M Cr in 1M HCl. In such a system, the concentration of Cr in the electrolytes is greater than the concentration of Fe by 0.2M. In the absence of any significant side reactions, a negative imbalance of −0.2M would not reduce the battery's capacity. However, a negative imbalance of −0.3M would reduce the capacity of the battery by the same amount as a positive imbalance of +0.1M due to the reduced availability of chargeable $Cr^{3+}$. In reality, a hydrogen generation side reaction is likely, and therefore the degree of imbalance to be maintained should be balanced with the potential for loss of battery capacity.

Thus, in various embodiments, for a pair of electrolytes with an excess quantity of negative reactant of about 0.2M, a start-point threshold value may be between about 0.0M and about −0.5M, or in more specific cases between about −0.01M and about −0.03M. Similarly, a threshold imbalance value at which processing should be stopped may be between about −0.03M and about −0.2M and in more specific cases between about −0.05M and about −0.1M.

Iron/Hydrogen Rebalancing System Background

Some rebalancing schemes include those that proceed spontaneously. Because imbalance in the Fe/Cr RFB results from parasitic hydrogen evolution at the negative electrodes of the RFB cells and or oxidation of the electrolyte by air intrusion, one way to correct the imbalance would be to lower the number of $Fe^{3+}$ ions via the chemical reaction:

$$H_2 + 2Fe^{3+} \rightarrow 2H^+ + 2Fe^{2+} \qquad EQ(3)$$

Although the above reaction is thermodynamically favored and therefore should be spontaneous, hydrogen reacts at appreciable rates only in the presence of a catalyst. For example, U.S. Pat. No. 7,156,972 to Diel, et al. ("Diel"), describes a method for lowering the $Fe^{3+}$ content of a plating bath by bubbling hydrogen over a platinum-coated metal screen immersed in the bath. This approach may not be practical for rebalancing RFB electrolytes because catalytic species, either as metallic particles or in the form of soluble ions, could be transferred via the RFB electrolytes to the negative electrodes. Since Pt is also a catalyst for hydrogen evolution, even a trace amount of Pt in the negative electrolyte of the RFB may greatly increase the rate of hydrogen generation, making this approach problematic.

Figure 2:
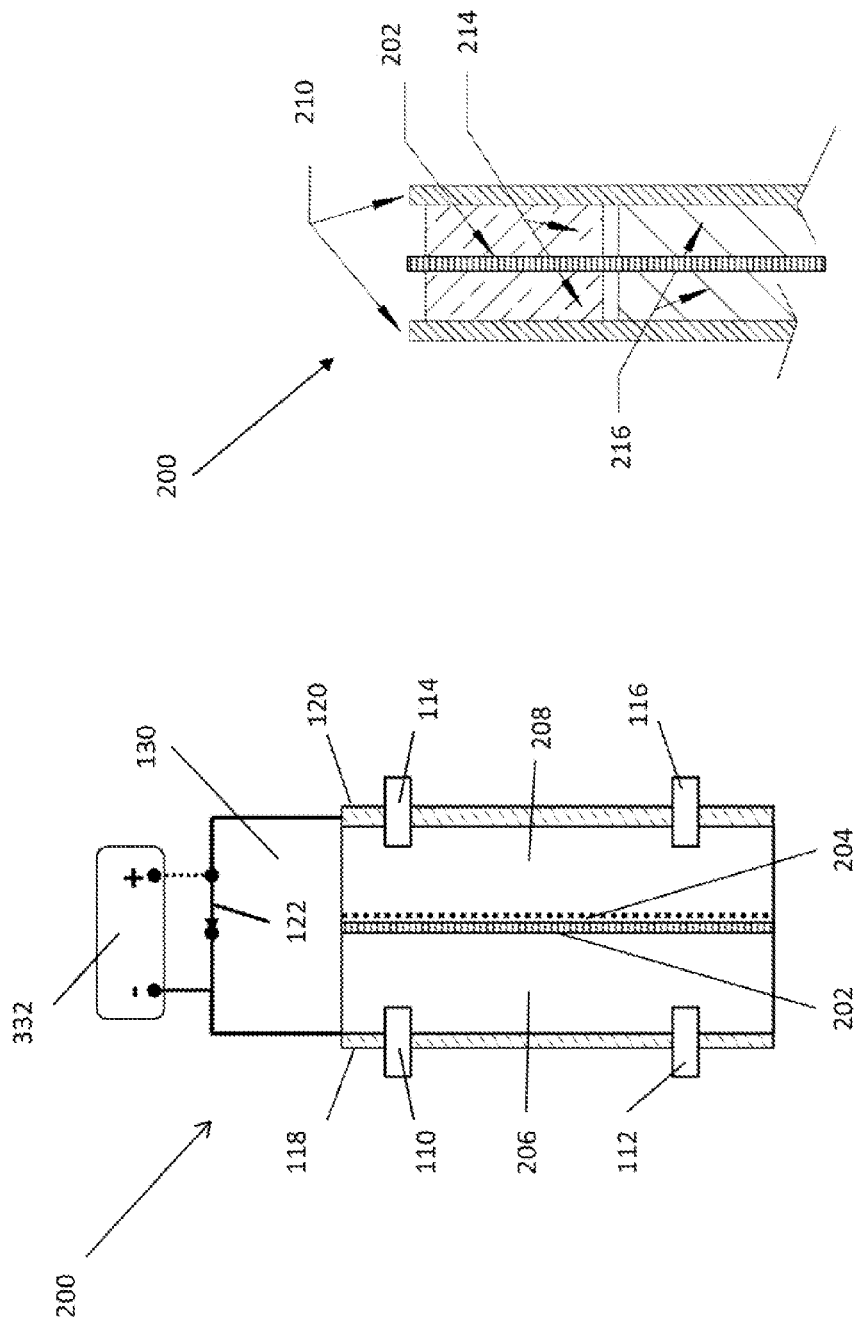
FIG. 2A is a diagram illustrating a single cell embodiment of an electrochemical system for electrolyte rebalancing.
FIG. 2B is a diagram further illustrating a single cell embodiment of an electrochemical system for electrolyte rebalancing.

A more practical approach would be to carry out the reaction in EQ(3) indirectly using an electrochemical cell 200 such as that shown in FIG. 2A and FIG. 2B, where an outer case is omitted for clarity, which may be used to rebalance an RFB electrolyte. The cathode chamber 206 and anode chamber 208 of the cell may be separated by an ion exchange membrane 202. At the anode 208 in the right-hand chamber of FIG. 2A, hydrogen is oxidized to proton, liberating one electron, which moves to the external electrical circuit to the power supply 332. At the same time, oxidized species such as $Fe^{3+}$ in the left-hand chamber 206 of FIG. 2A undergo a reduction reaction to be converted to $Fe^{2+}$, using the electron liberated by the hydrogen oxidation. To complete the circuit, the proton from the hydrogen reduction moves across the membrane from the right-hand chamber 208 to the left-hand chamber 206. The cathode 206 and the anode 208 of the cell 200 may be made of porous carbon felts or carbon cloths, or other similar porous, conductive materials that are low cost, and may be separated with a proton exchange membrane 202 (e.g., NAFION®), and a coating containing a catalyst for hydrogen oxidation may be bonded to the anode side 204 of the membrane 202.

In various embodiments, any suitable proton exchange membrane or cation exchange membrane may be used with systems described herein, depending on the specific needs of a given application. Currently, many fuel cell membranes are formed from perfluorinated sulfonic acid ("PFSA") materials. A commonly known PFSA membrane is Nafion® and is commercially available from DuPont. Others may include ACIPLEX® and FLEMION®. Other similar perfluorinated membrane materials are manufactured by companies such as W. L. Gore and Asahi Glass (e.g., as described in U.S. Pat. Nos. 6,287,717 and 6,660,818 respectively). Additionally, non PFSA membranes made from such materials as thermoplastics may be used as proton exchange membranes. Conventionally available thermoplastics including poly(ether ether ketone) ("PEEK"), poly(ether ketone) ("PEK"), poly (sulfone) ("PSU"), and poly(ether sulfone) ("PES"), as well as custom engineered thermoplastics such as polyarylene ether ketones, polyarylene sulfones, polynaphthalenimides and polybenzimidazoles ("PBI") types may also be utilized as proton exchange membranes.

Several methods exist for applying catalyst-containing coatings onto a surface of a membrane to form a so-called membrane-electrode assembly (MEA). In broad terms, such methods may generally comprise preparing a mixture of carbon black, catalyst materials (or precursors), and one or more binders, solvents or other substances as needed. Such a mixture, which may be referred to as a catalyst ink, may be applied and adhered to a membrane surface through any suitable process, such as spraying, painting, heating, drying, applying chemical agents, etc. Various processes for forming a catalyst-containing coating on a proton exchange membrane are known to those skilled in the art of fuel cells. Some examples are described in: U.S. Pat. No. 5,330,860, WO 2004/054021, EP 0731520, EP 1176655, U.S. Pat. No. 6,660, 419, and U.S. Pat. No. 7,220,514.

The rebalance cell 200 may further include a pair of conductive elements or plates 210 (which may be bipolar elements or plates in a multi-cell stack). In various embodiments, the conductive plates 210 may be constructed as conductive elements of any shape or structure, such as flexible conductive sheets, composite structures, or combinations of structures configured to meet the dual functions of sealing fluids within a half-cell and providing an electrically conductive contact and/or current collector. A gasket material 214 may be sandwiched between the conductive plates 210 and an ion exchange membrane 202 may be supported between sections of the gasket material and between porous felt electrodes 216. Electrolyte to be rebalanced may enter the cathode side 206 of the cell 200 via an inlet port 112 and exit via an outlet port 110. Hydrogen may enter the anode side 208 of the cell 200 via an inlet port 114 and unused hydrogen may exit via outlet port 116. Electronic current may flow between the anode terminal 120 and the cathode terminal 118 via external circuit 130. When rebalancing an electrolyte using a reaction that is spontaneous, the rebalancing reaction within the cell should occur spontaneously once the electrical circuit is closed. In the event that additional voltage is needed to drive the rebalancing reaction, an optional power supply 332 may be inserted between terminals 118 and 120 of cell 200 by moving switch 122 into the dotted line position. The power supply 332 may be a separate power supply or may be the same power supply as that which is used in the reaction stack (e.g., electric power source 20). Alternatively, the power supply 332 may be configured to draw power from the electric power source 20 used in the reaction stack.

Such a system uses the following reactions:

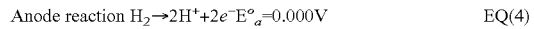

Anode reaction $H_2 \rightarrow 2H^+ + 2e^-$ $E°_a = 0.000V$        EQ(4)

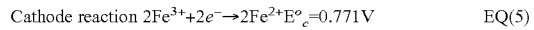

Cathode reaction $2Fe^{3+} + 2e^- \rightarrow 2Fe^{2+}$ $E°_c = 0.771V$        EQ(5)

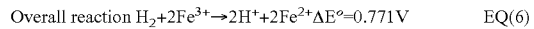

Overall reaction $H_2 + 2Fe^{3+} \rightarrow 2H^+ + 2Fe^{2+}$ $\Delta E° = 0.771V$        EQ(6)

The symbol E° represents the "standard potential" for a given electrode reaction and the subscripts "a" and "c" designate the anode and cathode reactions respectively. The symbol $\Delta E°$, which represents the difference ($E°_c - E°_a$), is positive for a spontaneous reaction (i.e., one that releases energy) and negative for a reaction that requires an input of energy. In the above example, the overall rebalancing reaction is spontaneous and the power supply 332 may thus be omitted, i.e. the rebalance cell may be electrically shorted. Similarly, the power supply 332 may be omitted for any other embodiments utilizing spontaneous reactions.

In the Hydrogen rebalancing method, platinum (Pt) may be used as the catalyst in a coating layer 204 adhering to the membrane 202 on the anode (hydrogen) side 208 of the cell 200. An example of a positive electrolyte to be rebalanced may contain 0.2-1.0 M of the oxidizing agent $Fe^{3+}$ and 5-8M $Cl^-$.

Although the Pt catalyst is separated from the electrolyte by a layer of proton exchange membrane, the separation is not perfect and after prolonged use, traces of dissolved platinum can appear in the positive electrolyte. It is well known that proton exchange membranes do not conduct protons exclusively. Other cations, such as $Fe^{2+}$ and $Fe^{3+}$ may also migrate across the membrane as well. The presence of $Fe^{3+}$ on the hydrogen side can be detrimental to the Pt catalyst as it can oxidize Pt metal to $PtCl_4^{2-}$, which may then be dissolved in solution. The dissolved $PtCl_4^{2-}$ can then migrate to the electrolyte side of the rebalance cell across the proton exchange membrane. This may be further clarified by the following:

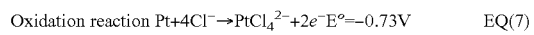

Oxidation reaction $Pt + 4Cl^- \rightarrow PtCl_4^{2-} + 2e^-$ $E° = -0.73V$        EQ(7)

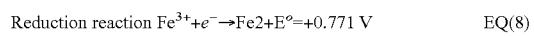

Reduction reaction $Fe^{3+} + e^- \rightarrow Fe2 + E° = +0.771V$        EQ(8)

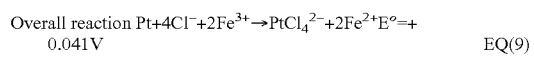

Overall reaction $Pt + 4Cl^- + 2Fe^{3+} \rightarrow PtCl_4^{2-} + 2Fe^{2+}$ $E° = +0.041V$        EQ(9)

The overall E° is positive, indicating a spontaneous reaction when the concentrations of the reactants and products are 1 M. In some flow battery electrolytes, the concentration of $Cl^-$ is higher than 1 M. The concentration of $PtCl_4^{2-}$ is much less than 1 M. These relative concentrations make the reaction happen even more easily.

The soluble Pt species in the positive electrolyte can be carried all the way to the battery electrolyte tank and into the RFB's reaction stacks where it may be reduced to metallic Pt somewhere in the negative side of the RFB reaction cells. As indicated above, the net result of Pt deposition on the negative electrodes of an RFB cell stack would be to increase the rate of hydrogen generation, thereby requiring ever more rebalancing.

In various embodiments described herein, a platinum catalyst may be replaced by other suitable catalysts for the hydrogen reactions described. Such alternative catalyst materials may include platinum alloys, tungsten carbide (WC), palladium (Pd), rhodium (Rh), other precious metals, or other materials. In some cases, a hydrogen reaction catalyst may include a single metal, while in other cases, a catalyst may comprise multiple metals alloyed or otherwise combined with one another. For example, researchers with the Lawrence Berkeley National Laboratory and Argonne National Laboratory have developed highly reactive bimetallic nanocatalysts utilizing a polyhedral-shaped nanoframe of platinum and nickel ("Highly Crystalline Multimetallic Nanoframes with Three-Dimensional Electrocatalytic Surfaces", Chen et. al., *Science DOI:* 10.1126/science.1249061, Published Feb. 27, 2014).

The various embodiments of systems and methods described below generally seek to exploit the energy-saving benefits of the hydrogen rebalancing system, while mitigating or eliminating the risks of Pt transfer into the RFB electrolytes. To accomplish this, various embodiments may incorporate one or more of the following approaches:

1) Reducing the chance of catalyst contamination of RFB electrolytes by employing a mediator solution to eliminate direct contact between the catalyzed membrane and the RFB electrolyte, and 2) Adopting a rebalance cell chemistry that cannot oxidize Pt, thereby preventing it from dissolving.

The systems and methods described herein may also apply equally well to preventing contamination of flow battery electrolytes by other catalyst materials.

Hydrogen Rebalancing Systems Using Mediator Solutions

Therefore, according to some embodiments of the systems and methods herein, the transfer of dissolved platinum into the RFB electrolytes during rebalancing may be controlled or even substantially eliminated by adopting various arrangements that prevent direct contact between a platinum-coated membrane and the RFB electrolytes. For example, this separation may be accomplished by conducting the rebalancing operation indirectly via a "mediator solution" which may be circulated between two separate cells. In some embodiments, the mediator solution may be of similar composition to the electrolyte being rebalanced.

Figure 3:
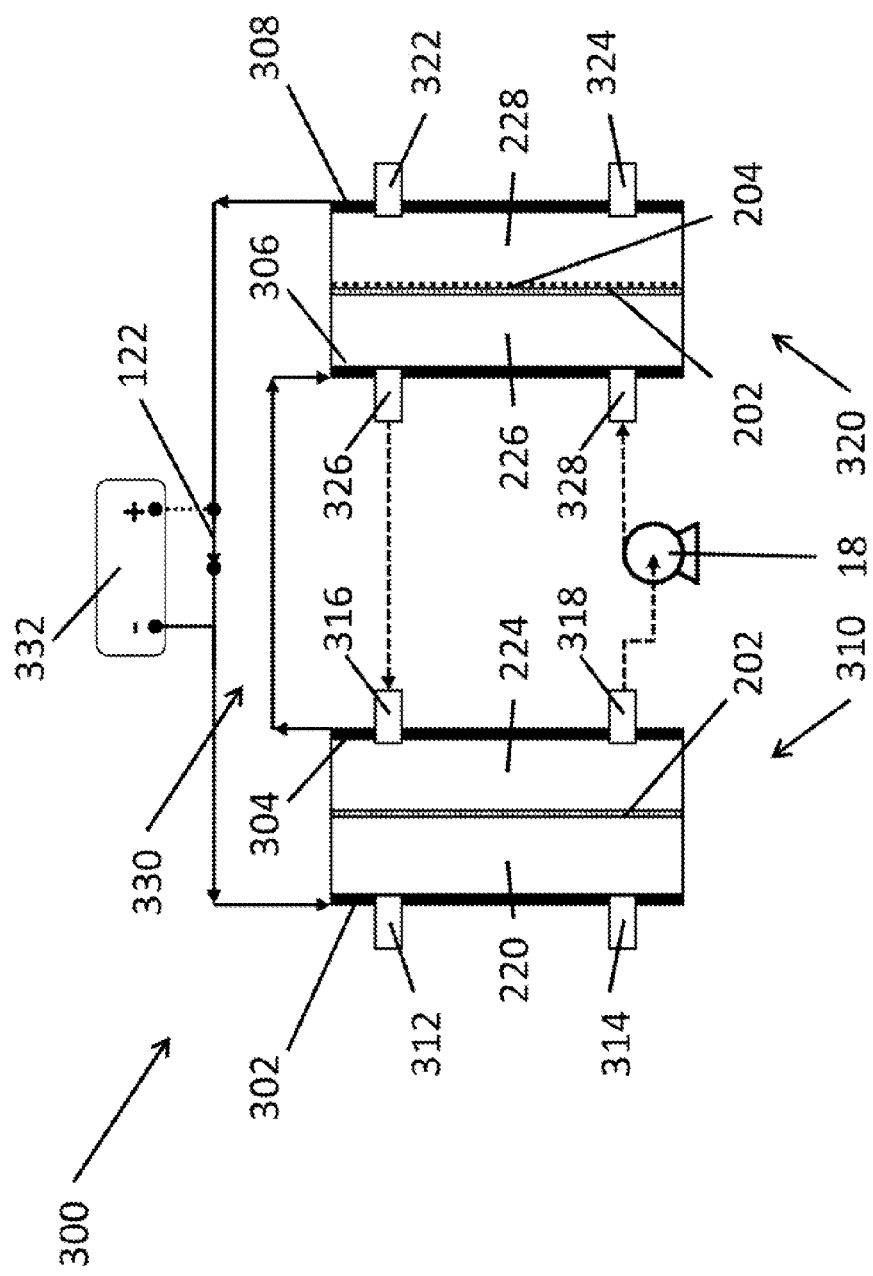
FIG. 3 is a diagram illustrating a two-cell embodiment of an electrochemical system for electrolyte rebalancing.
Figure 4:
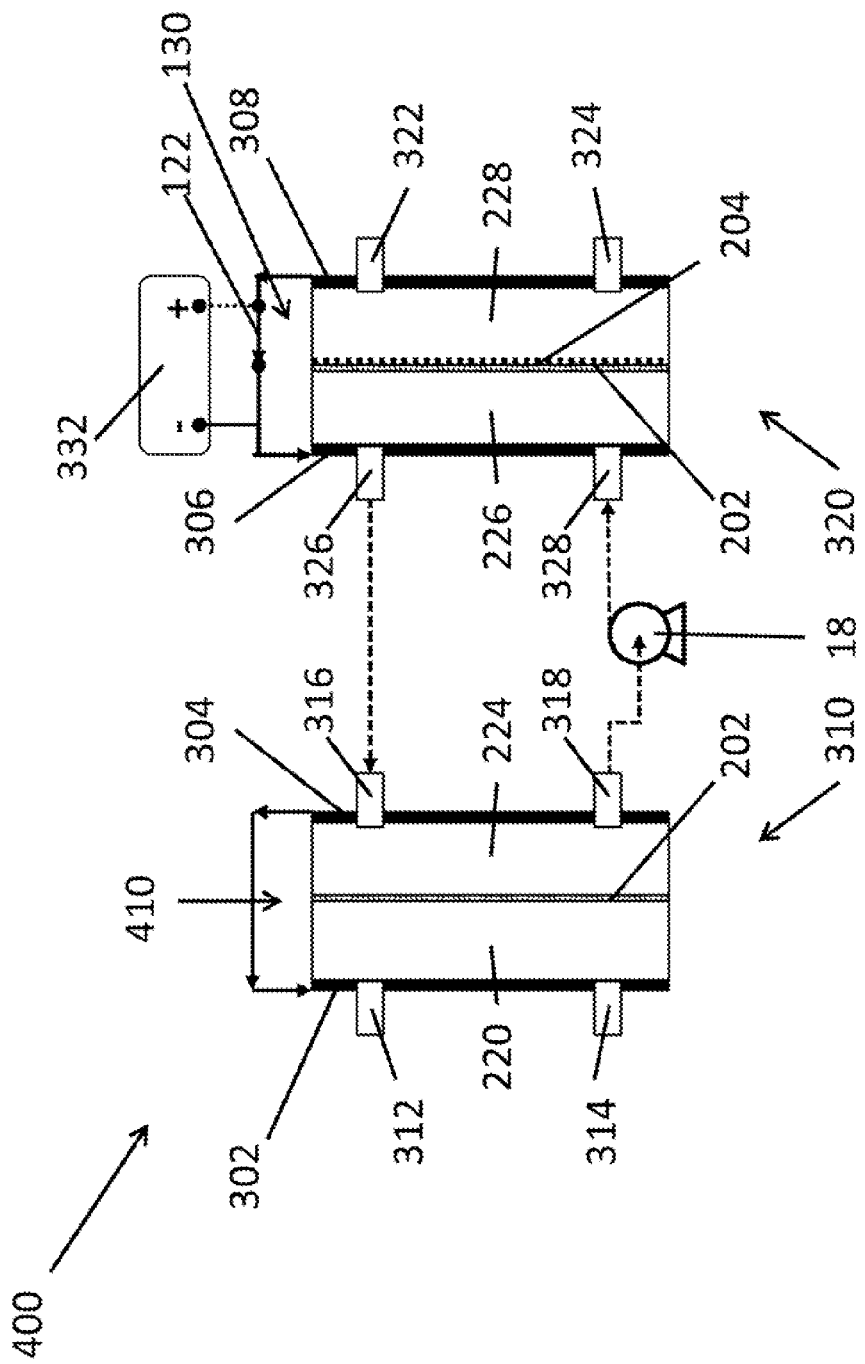
FIG. 4 is a diagram illustrating two electrically independent cells in an embodiment of an electrochemical system for electrolyte rebalancing.

Exemplary embodiments of a mediated two-cell rebalancing approach are shown in FIG. 3 and FIG. 4. In an example, two cells 310 and 320 may be electrically connected in series. Two chambers of each cell 220, 224 and 226, 228 may be separated by ion exchange membranes 202, and each chamber 220, 224 and 226, 228 may be occupied by a porous conductor made from a low-cost conductive material such as carbon felt. Current collector plates, which may be made from a solid conductive material such as carbon or a carbon-impregnated polymer, may be positioned at terminal sides 302, 304, 306, 308 of each cell chamber, 220, 224, 226, 228, and may further include suitable electrical contacts to serve as terminals for connecting the cells to an electric circuit 330. A mediator solution may be circulated between the inner chambers 224 and 226 of the two cells. The mediator solution may be circulated by a pump 18 between a cathode chamber 226 of a hydrogen reaction cell 320 and an anode chamber 224 of an electrolyte rebalancing cell 310. The circulation path of the mediator solution is indicated by dotted lines. As will be described in further detail below, the use of a mediator solution substantially reduces the chances of dissolved catalyst migrating into the RFB electrolyte.

The systems of FIGS. 3 and 4 each include a hydrogen reaction cell 320 having an anode chamber 228 with a hydrogen inlet 322 and a hydrogen outlet 324, and a cathode chamber 226 having a mediator inlet 328 and a mediator outlet 326. The system may also include a rebalance cell 310 comprising an anode chamber 224 with a mediator inlet 316 and a mediator outlet 318, and a cathode chamber 220 with an electrolyte inlet 314 and an electrolyte outlet 312.

In some embodiments, the separator membranes 202 in both the hydrogen cell 320 and the rebalance cell 310 may each be an ion exchange membrane such as a cation exchange membrane. In some embodiments, the separator membrane 202 in the hydrogen cell 320 may have a catalyst-containing coating on the negative (hydrogen) side 204. In some embodiments, the membranes in the hydrogen cell 320 and/or in the rebalance cell, 310 may also be composed of an anion exchange material or a microporous membrane. However, in some cases, a microporous membrane may be less desirable as it may not adequately block the transfer of contaminants from the mediator solution to the RFB electrolyte.

A mediator solution may be pumped between the anode chamber 224 of the rebalance cell 310 and the cathode chamber 226 of the hydrogen cell 320. The pump 18 may be any style of pump as desired. Alternatively, circulation of the mediator solution may be effected by harnessing phenomena such as diffusion driven by concentration gradients, thermal convection driven by temperature gradients, percolation, driven by a stream of hydrogen or other gas bubbles, or other phenomena. In some embodiments, the energy needed to produce these or other phenomena may be derived from waste heat.

In some embodiments, the mediator solution may have a composition substantially similar or identical to the RFB electrolyte to be rebalanced. For example, in embodiments in which a positive electrolyte in an Fe/Cr RFB system is to be rebalanced, the mediator solution may include a mix of $Fe^{3+}$, $Fe^{2+}$ and $Cr^{3+}$ ions. Similarly, in embodiments in which a negative electrolyte in an Fe/Cr RFB system is to be rebalanced, the mediator solution may include a mix of $Cr^{3+}$, $Cr^{2+}$ and $Fe^{2+}$ ions. Regardless of the initial concentrations of the two species, they will eventually approach the ratio of 1:1. However, initial rebalancing rates will be slow if the ratio is far from 1:1 because the initial current will be limited by the supply of the less abundant species.

In some embodiments, the mediator solution may be a "mixed reactant" solution containing both RFB reactants (e.g., Fe and Cr). Efficiency of the rebalancing process may be improved with a mixed reactant mediator solution because conductivity of ionic solutions tends to increase with ionic concentration and ohmic losses may be lower. For the same reason, the mediator solution may incorporate species of high ionic conductivity such as strong acids (e.g., HCl, $H_2SO_4$, $HClO_4$). Therefore, in some embodiments, all of a positive flow battery electrolyte, a negative flow battery electrolyte and a mediator solution may be similar or identical mixed reactant electrolytes.

In other embodiments, the mediator solution may contain electrochemical reactants other than those used by the RFB electrolytes. In still further embodiments, a mediator solution may contain substantially no redox reactants. A solution with no redox reactants can be used as a mediator solution in various mediated rebalancing systems described herein. For example, in some embodiments, a volume of HCl may be used as a mediator solution. If a volume of 3 M HCl is used as the mediator solution, the resulting reactions may be those shown below. The notations (m) and (e) represent mediator solution and electrolyte, respectively.

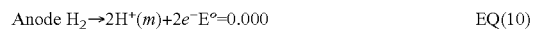
$$\text{Anode } H_2 \rightarrow 2H^+(m) + 2e^- \quad E°=0.000 \qquad \text{EQ(10)}$$

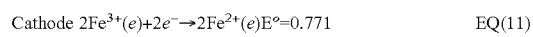
$$\text{Cathode } 2Fe^{3+}(e) + 2e^- \rightarrow 2Fe^{2+}(e) \quad E°=0.771 \qquad \text{EQ(11)}$$

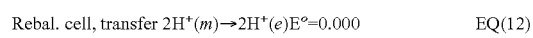
$$\text{Rebal. cell, transfer } 2H^+(m) \rightarrow 2H^+(e) \quad E°=0.000 \qquad \text{EQ(12)}$$

Overall reaction $H_2+2Fe^{3+}(e) \rightarrow 2H^+(e)+2Fe^{2+}(e)$
$E°=0.771$ EQ(13)

In this case, the $H^+$ generated in the anode reaction simply passes through the mediator solution and transfers to the electrolyte to be rebalanced. In effect, the entire mediator solution may behave like a thick membrane.

In various embodiments, a wide range of mediator solution concentrations may be used in a mediated rebalance system such as those described herein. In some embodiments, mediator solutions may have some characteristics that resemble those of the RFB electrolyte to be rebalanced and other characteristics that do not. For example, it may be desirable to select a mediator solution that contains $H^+$ ions and other cation species found in the electrolyte but does not contain any other cation species. It may be further desirable to select a mediator solution that has an electrical conductivity comparable with that of the RFB electrolyte and that has an osmotic pressure comparable with that of the RFB electrolyte. It may be further desirable to select a mediator solution that contains electrochemically active redox couples to speed up the rebalancing process and excludes electrochemically active redox couples to limit possible electrochemical dissolution of catalyst species.

The hydrogen cell 320 may generally be configured to support an electrochemical reaction in which hydrogen is oxidized while an active material in the mediator solution is reduced. The mediator solution containing an increased concentration of the reduced active material may then be transferred to the anode chamber 224 of the rebalance cell 310, where a second electrochemical reaction may occur. The rebalance cell 310 may be configured such that a rebalancing electrochemical reaction occurs between the reduced mediator solution and the unbalanced electrolyte.

$H_2$ gas may be fed into the anode side 228 of the hydrogen cell 320. In some embodiments the $H_2$ delivered into the hydrogen cell 320 may include captured hydrogen generated by parasitic reactions during RFB operation. Such generated hydrogen may be captured and directed into the hydrogen cell 320 using any known gas separation devices, transport conduits, pumps or other devices as needed. In some embodiments, additional make-up hydrogen may also be provided. Such make-up hydrogen gas may be provided from tanks or may be generated on-site. One example of a hydrogen generation system for providing make-up hydrogen to the hydrogen cell 320 is described below with reference to FIGS. 12A & 12B. Hydrogen gas may be moved through the RFB, including the rebalance system by any suitable pump or other device.

The rate of the rebalancing process using a system such as those shown in FIGS. 3-5 and 9 may generally depend on factors such as a supplied electrical current (if needed), a rate at which electrolyte is supplied to the cell, a rate at which hydrogen is supplied to the cell, a rate at which the mediator solution is circulated between the two cells, and electrical connections between the two cells. Any or all of these may be varied in order to achieve a desired rebalance rate. For example, in some embodiments it may be desirable to keep pumping rates as low as possible to minimize the energy expense of operating pumps. A particular desired rebalancing rate may be established, for example, to rebalance a quantity of electrolyte or to achieve a given stoichiometric relationship within an electrolyte within a certain period of time.

Hydrogen gas may be supplied to the hydrogen cell in various ways. For example, in some embodiments the anode chamber 228 of the hydrogen cell 320 may be configured with a termination, or in a "dead-end" fashion, such that $H_2$ gas may flow into, but not out of the anode chamber 228. In such embodiments, the gas in the anode chamber may be maintained at a sufficient pressure to supply sufficient $H_2$ gas to at least meet a rate of consumption required by a chosen reaction rate. In other embodiments, $H_2$ gas may be flowed into the anode chamber 228, for example to an inlet, at a sufficient flow rate to meet or exceed a rate of $H_2$ consumption required by a chosen reaction rate. Any un-used $H_2$ gas may be allowed to exit the anode chamber 228, for example, through an outlet, and may be vented to atmosphere, or may be captured and re-directed to a source or repository of hydrogen gas. In some such embodiments, $H_2$ gas may be supplied to the anode chamber 228 at a rate of at least 120% of a consumption rate required to maintain a desired reaction rate. In still further embodiments, hydrogen gas may be supplied in a continuously recirculating fashion. In such embodiments, hydrogen gas may be circulated between a source (such as a tank) and the anode chamber 228 at a flow rate sufficient to meet or exceed a desired consumption rate. In some embodiments, a rate of actual or expected hydrogen consumption may be determined by experimentation or by calculation based on other factors affecting the rebalancing reaction rate.

As in previous embodiments, some portion of the hydrogen consumed in the anode chamber(s) of the hydrogen cell may be captured from an RFB system using any suitable gas separation and transport devices as needed. In some embodiments, the quantity of hydrogen captured from the RFB may be measured and subtracted from a total required quantity of hydrogen to be supplied by another source. Additional hydrogen may be supplied from a tank or any other source.

The electrolyte to be rebalanced may be pumped into, for example, an inlet on the cathode side 220 of the rebalance cell 310. In various embodiments, the rate of supply of electrolyte to the rebalance cell 310 may be controlled independently by a controller configured to control the rebalancing system, or by a controller configured to control the entire RFB system. The rate at which electrolyte is supplied to the rebalance system may be controlled according to any desired control parameters, such as maintaining a desired rebalancing rate.

The embodiments of FIG. 3 and of FIG. 4 illustrate alternative electrical connections between the cells 310, 320. In the system of FIG. 3, the cells 310, 320 are connected in series in a single electric circuit 330 connecting the terminal 302 of the rebalance cell cathode 220 with the terminal 308 of the hydrogen cell anode 228, and the terminal 306 of the hydrogen cell cathode 226 with the terminal 304 of the rebalance cell anode 224. In the configuration of FIG. 3, electrical current produced by one cell flows through the other cell before the circuit is completed.

In the system of FIG. 4, the anode terminal 308 and cathode terminal 306 of the hydrogen cell 320 may be connected together and the anode terminal 304 and cathode terminal 302 of the rebalance cell may be connected together. Because the two cells are electrically separate in the FIG. 4 arrangement, electric current flows within each cell independently.

In the case of an Fe/Cr RFB with unbalanced electrolytes, rebalancing may be performed either by lowering the concentration of $Fe^{3+}$ ions in the positive electrolyte or by increasing the concentration of $Cr^{2+}$ ions in the negative electrolyte.

For example, if a positive Fe/Cr electrolyte is to be rebalanced, $Fe^{3+}$ ions in the mediator solution may be reduced to $Fe^{2+}$ in the hydrogen cell 320, identified in the equations below as the $H_2$ cell, and excess $Fe^{3+}$ ions in the RFB electrolyte may be reduced in to $Fe^{2+}$ in the cathode chamber 220 of the rebalance cell 310 identified in the equations below as the "Rebal" cell. The reactions for this example are shown below. The notation (e) and (m) denotes "electrolyte" and "mediator solution," respectively.

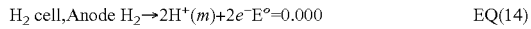
$$H_2 \text{ cell,Anode } H_2 \rightarrow 2H^+(m)+2e^- \; E°=0.000 \quad EQ(14)$$

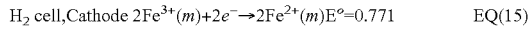
$$H_2 \text{ cell,Cathode } 2Fe^{3+}(m)+2e^- \rightarrow 2Fe^{2+}(m) E°=0.771 \quad EQ(15)$$

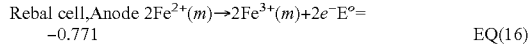
$$\text{Rebal cell,Anode } 2Fe^{2+}(m) \rightarrow 2Fe^{3+}(m)+2e^- \; E°=-0.771 \quad EQ(16)$$

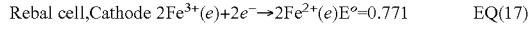
$$\text{Rebal cell,Cathode } 2Fe^{3+}(e)+2e^- \rightarrow 2Fe^{2+}(e) E°=0.771 \quad EQ(17)$$

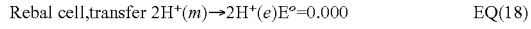
$$\text{Rebal cell,transfer } 2H^+(m) \rightarrow 2H^+(e) E°=0.000 \quad EQ(18)$$

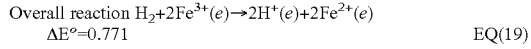
$$\text{Overall reaction } H_2+2Fe^{3+}(e) \rightarrow 2H^+(e)+2Fe^{2+}(e) \; \Delta E°=0.771 \quad EQ(19)$$

Since the overall reaction has a highly positive $\Delta E°$ and does not involve either $Fe^{3+}(m)$ or $Fe^{2+}(m)$, the reaction may be spontaneous regardless of $Fe^{3+}$ and $Fe^{2+}$ concentrations in the mediator solution. However, the rate of the reactions may be affected by the concentrations of reactant species, as explained below.

For a single-loop electrical connection such as that shown in FIG. 3, the rate of reaction described by equation EQ(15) in the hydrogen cell 320 (the "$H_2$ cell" in this example) may be limited by the concentration of $Fe^{3+}$ in the mediator solution. On the other hand, the rate of reaction described by equation EQ(16) in the rebalance cell 310 may be limited by the concentration of $Fe^{2+}$ in the mediator solution. When the two cells are connected in series, a slow reaction in either cell can slow down the reaction rate for the whole rebalance system. Therefore, for optimal efficiency, the mediator solution may ideally contain substantial and roughly equal concentrations of the two active species (i.e., $Fe^{3+}$ and $Fe^{2+}$ in this example).

For a two-loop electrical connection such as that shown in FIG. 4, the rates of the two cell reactions may differ initially, but eventually they will become equal. This can be understood by considering the following. Suppose the mediator solution contains concentrations of $Fe^{3+}$ and $Fe^{2+}$ equal to the concentrations of those species in the RFB electrolyte to be rebalanced. In this case, the reaction rate in the rebalance cell 310 would be zero because the electrodes would have identical potentials and the cell voltage would also be zero. At the same time, the reaction in the hydrogen cell 320 ($H_2$ cell) would be relatively fast because of the large difference in the E° for the two electrode reactions in that cell 320 (reactions of EQ(14) and EQ(15) above). As a result, the $Fe^{3+}$ in the mediator would be reduced to $Fe^{2+}$ more rapidly in the hydrogen cell 320 ($H_2$ cell) than the reverse reaction in the rebalance cell 310. Hence, the concentration of $Fe^{3+}$ in the mediator solution would decrease and that of $Fe^{2+}$ would increase until the system reached a steady state, at which point, the two reactions in the two cells may operate at an equal rate.

There are trade-offs between the one-loop and the two-loop electrical connections. An advantage of the one-loop connection configuration of FIG. 3 is that the reaction rate is faster if started from approximately equal $Fe^{3+}$ and $Fe^{2+}$ concentrations in the mediator solution. However, if the $Fe^{3+}$ and $Fe^{2+}$ concentrations are substantially unequal, the rebalance reaction rate may be slow for the length of an entire rebalancing process. An advantage of the two-loop connection configuration of FIG. 4 is that the system may self-adjust to a steady state with an acceptable rate, regardless of the initial $Fe^{3+}$ and $Fe^{2+}$ concentrations in the mediator solution. However, this self adjusting process may take a long time, during which the reaction rate may be slower than desired.

Figure 5:
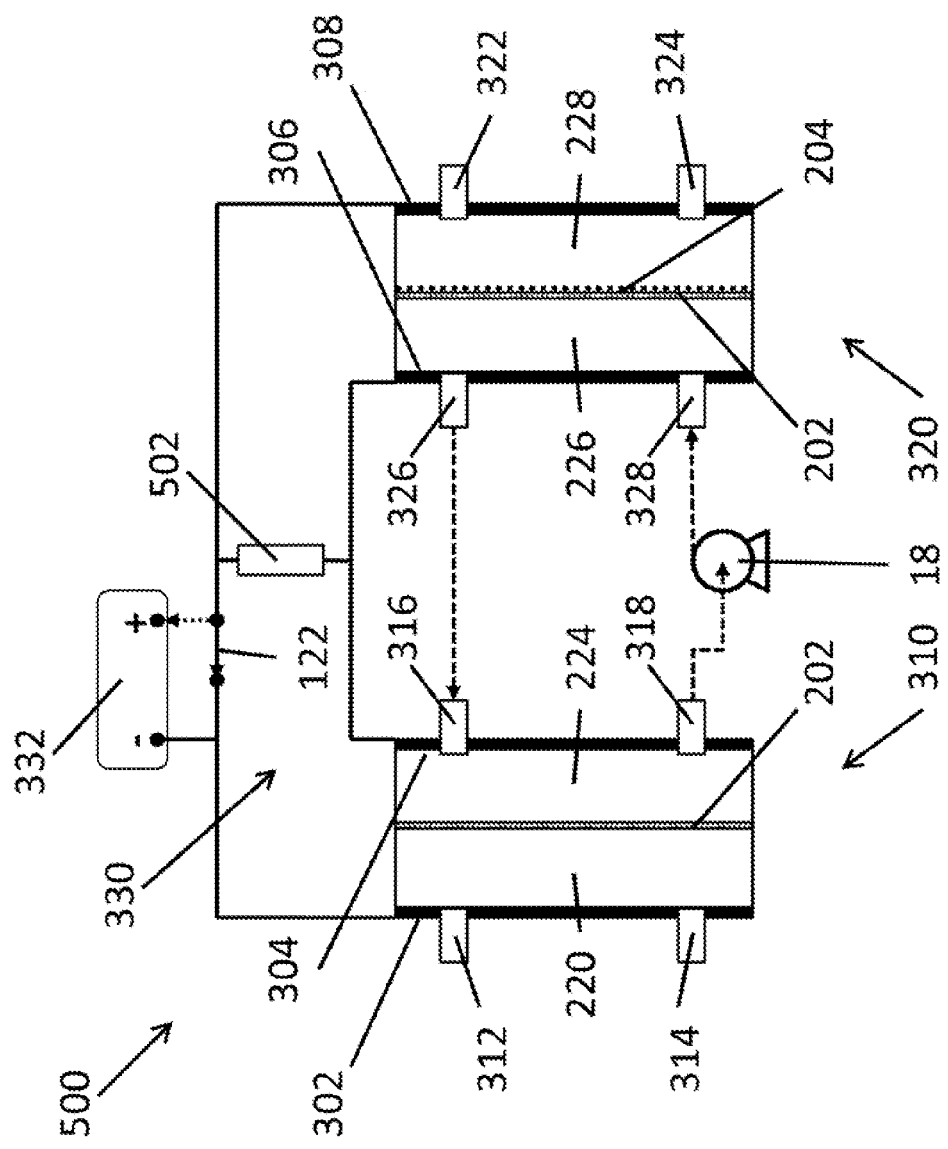
FIG. 5 is a diagram illustrating a bypass resistor in an embodiment of an electrochemical system for electrolyte rebalancing.

Since both one-loop and two-loop electrical connection arrangements each provide advantages under different conditions, it may be desirable to combine aspects of the two arrangements. Hence, in some embodiments, the one-loop connection configuration of FIG. 3 may be modified by adding a resistor 502 (e.g., a variable resistor) as shown in FIG. 5. As explained below, if the value of the resistor is much greater than the resistances of the cells, then the system may behave like the fixed one-loop system described above. Alternatively, if the value of the resistor is much smaller than the resistances of the cells, then the system may behave like a two loop system.

Referring to FIG. 3, consider a case in which all of the redox reactant in the mediator is in the oxidized state, e.g., $Fe^{3+}$. This would mean that no anodic reaction is possible in the anode chamber 224 of the rebalance cell 310. As a result, cell 310 acts like an open circuit and no current can flow in circuit 330. Consequently, even though there may be ample driving voltage in the hydrogen cell 320, no cathodic reaction can take place in chamber 226 and the rebalance process can never get started. However, the insertion of a resistor 502 in circuit 330 as shown in FIG. 5 provides an alternative path for current to flow through the hydrogen cell 320, allowing cathodic reduction of the redox species e.g., from $Fe^{3+}$ to $Fe^{2+}$ in cathode chamber 226. The reduced reactant may then be pumped into the rebalance cell 310, allowing current to flow through that cell. Hence, depending on the magnitude of resistor 502, the mediator composition will move towards an optimum ratio of oxidized and reduced species.

Referring again to FIG. 3, consider a case in which all of the reactant in the mediator is in the reduced state e.g., $Fe^{2+}$. In this case, it is the hydrogen cell 320 where current is blocked because there is no possibility of a cathodic reaction in chamber 226. Hence current flow in circuit 330 is blocked and no electrode reactions can proceed in the rebalance cell 310. However, the insertion of a resistor 502 in circuit 330 as shown in FIG. 5 provides an alternative path for current to flow through the rebalance cell 310, allowing anodic oxidation of the redox species e.g., from $Fe^{2+}$ to $Fe^{3+}$. The oxidized reactant is then pumped into the hydrogen cell 320, allowing current to flow through that cell. Hence, depending on the magnitude of resistor 502, the mediator composition will again move towards an optimum ratio of oxidized and reduced species. The value of the resistor 502 may be either adjustable or fixed. For example, during initial system operation or development, an adjustable resistor may be used until an optimal value is established by experimentation. After that, a fixed resistor of optimum value may be employed. In some embodiments, an optimum resistance value may be one that allows for the most efficient rebalancing operation under a range of conditions expected for a given RFB system.

Figure 6B:
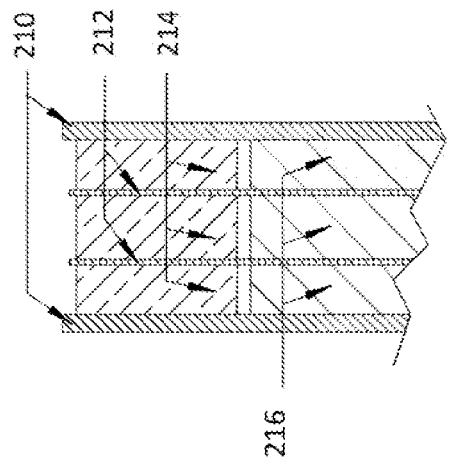
FIG. 6B is a diagram further illustrating a three chamber embodiment of an electrochemical system.
Figure 6A:
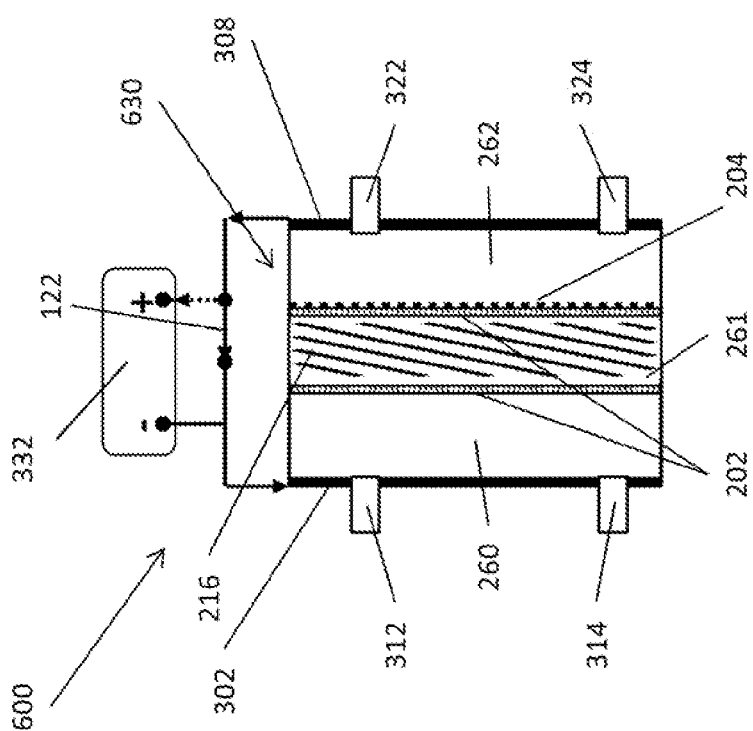
FIG. 6A is a diagram illustrating a three-chamber embodiment of an electrochemical system for electrolyte rebalancing.

In some embodiments, the cost of the pump and the complexity of fluid connections may be avoided by using a 3-chamber cell such as that shown in FIGS. 6A and 6B. Each chamber 260, 261 and 262 may be occupied by a porous conductor made from a low cost conductive material such as carbon felt. The center chamber 261 may contain a non-circulating mediator solution. Electrical contact to the system may be made via two solid carbon current collector end plates 302 and 308.

The 3-chamber arrangement serves the same purpose as the one-loop, two-cell system in FIG. 3 by combining the cathode chamber 226 of the $H_2$ cell and the anode chamber 224 of the rebalance cell into a single "mediator" chamber 261, as shown in FIG. 6A. The mediator chamber 261 may be separated from the rebalancing chamber 260 and the hydrogen anode chamber 262 by ion exchange membranes 202. A porous electrode material such as carbon felt 216 may be positioned within the mediator chamber 261 which may be filled with the mediator solution. The mediator chamber 261 has no fluid connections and under normal operation, the mediator solution remains stagnant. In addition to lowering system cost and complexity, the three-chamber cell may also be more compact than the two-cell systems described above.

In the case of an Fe/Cr rebalance system, a three-cell rebalance system may operate according to the reactions shown below. These reactions are the same as those in some embodiments of a two-cell system described above. As before, the notation (e) and (m) denotes "electrolyte" and "mediator solution".

$$\text{Anode } H_2 \rightarrow 2H^+(m) + 2e^- \quad E^\circ = 0.000 \quad \text{EQ(20)}$$

$$\text{Mediator, anode side } 2Fe^{3+}(m) + 2e^- \rightarrow 2Fe^{2+}(m)$$
$$E^\circ = 0.771 \quad \text{EQ(21)}$$

$$\text{Mediator, cathode side } 2Fe^{2+}(m) \rightarrow 2Fe^{3+}(m) + 2e^- \quad E^\circ = -0.771 \quad \text{EQ(21)}$$

$$\text{Cathode } 2Fe^{3+}(e) + 2e^- \rightarrow 2Fe^{2+}(e) \quad E^\circ = 0.771 \quad \text{EQ(23)}$$

$$\text{Rebal. cell, transfer } 2H^+(m) \rightarrow 2H^+(e) \quad E^\circ = 0.000 \quad \text{EQ(24)}$$

$$\text{Overall reaction } H_2 + 2Fe^{3+}(e) \rightarrow 2H^+(e) + 2Fe^{2+}(e)$$
$$E^\circ = 0.771 \quad \text{EQ(25)}$$

The concentrations of $Fe^{3+}$ and $Fe^{2+}$ in mediator solution do not appear in the overall reaction because reactions EQ(21) and EQ(22) cancel each other. Because of this, these concentrations do no change significantly during the operation of the system, except for minor changes caused by diffusion. However, during certain phases of operation, it is desirable to change these concentrations. For example, when the system is idle, a lower $Fe^{3+}$ concentration may be desired in order to minimize the dissolution of Pt into the mediator solution. When the system is operating, sufficiently high $Fe^{3+}$ and $Fe^{2+}$ concentrations may be desired for higher reaction rate. Therefore, a method of adjusting the reactant concentrations (e.g., the concentrations of $Fe^{3+}$ and $Fe^{2+}$ in some embodiments) in the mediator solution can be useful.

Adjusting $Fe^{3+}$ and $Fe^{2+}$ Concentrations in a Mediator Solution

One method of adjusting the mediator reactant concentrations (e.g., $Fe^{3+}$ and $Fe^{2+}$ concentrations) is to simply replace the mediator solution through a set of fluid ports connected to the mediator chamber(s). In some embodiments, the mediator solution may be replaced before a concentration of Pt in the mediator solution becomes high enough that migration of Pt into the RFB electrolyte becomes possible, which concentration may be detected by a concentration detection system, or which may be based on an empirically-determined number of rebalance cycles, or some other metric. The mediator solution may be drained and replaced in any of the two-cell or three-chamber systems described herein. In some cases, replacement of the mediator solution may be an undesirable method of adjusting concentrations $Fe^{3+}$ and $Fe^{2+}$ because it may require additional solution preparation and it may generate waste. Nonetheless, replacing the mediator solution may be a useful method of controlling platinum migration.

Figure 7B:
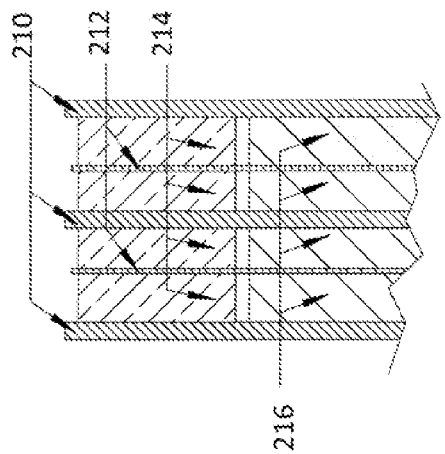
FIG. 7B is a diagram further illustrating a three-chamber embodiment of an electrochemical system.
Figure 7A:
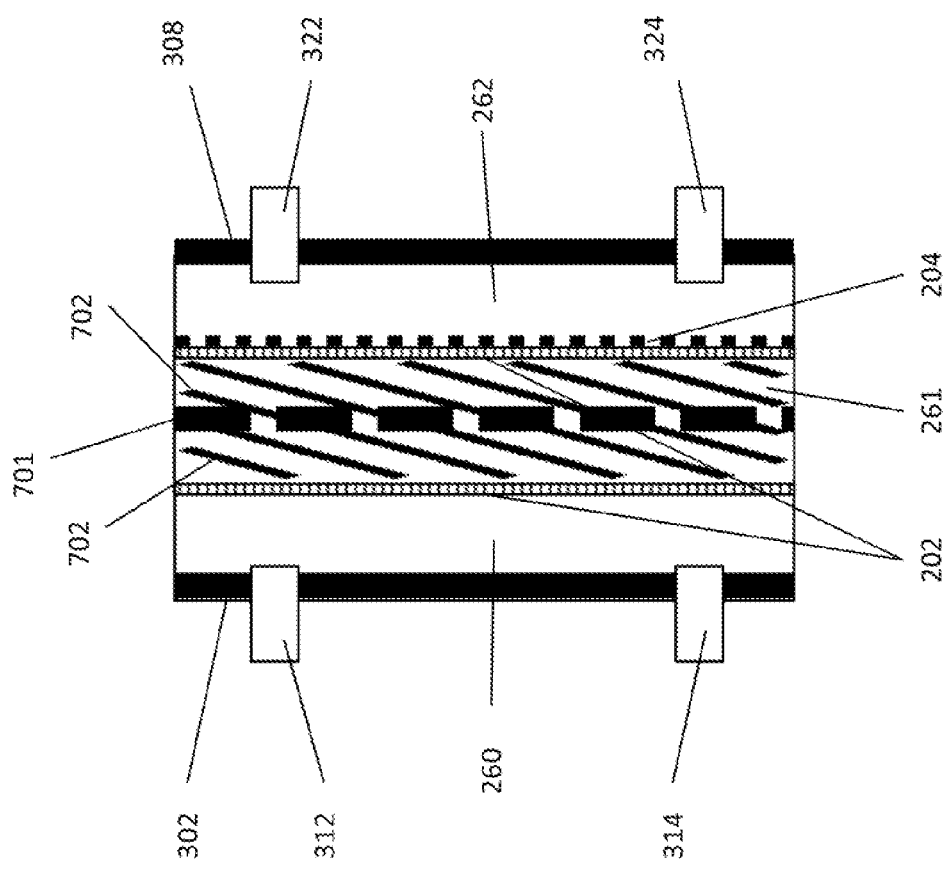
FIG. 7A is a diagram illustrating a three chamber embodiment of an electrochemical system for electrolyte rebalancing having a perforated current collector in a middle chamber.

An alternative approach to adjusting the reactant concentrations (e.g., $Fe^{3+}$ and $Fe^{2+}$ concentrations) is made possible by adding an electrical connection to the mediator electrode 702 as shown in FIGS. 7A & 7B. In this embodiment, the mediator electrode 702 may comprise two sheets of carbon felt and a thin, perforated current collector of a conductive material, such as carbon or other electronic conductor 701, which may be sandwiched between the two carbon felt layers. Electronic contact to the mediator electrode 702 may then be made via the current collector 701. The perforations in the current collector are preferably sufficient to allow for the free exchange of mediator solution between the two carbon felt sections of the mediator electrode 702. To this end, the perforations may be of any convenient shape (e.g., circles, triangles, squares, rectangles, oblongs, etc.) and size and they may be arranged in any pattern (e.g., square, hexagonal, radial, etc.). The separation between adjacent holes may be as needed to provide a sufficient perforated area while achieving the desired current collection.

Figure 8A:
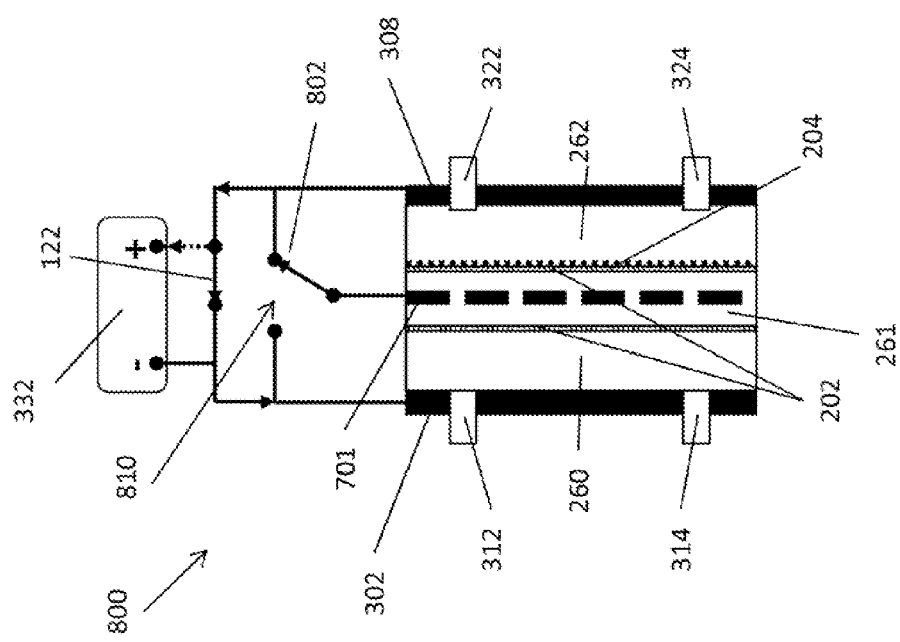

In some embodiments of a cell 800, as shown in FIGS. 8A, 8B and 8C, the current collector 701 of the mediator electrode 261 may be electrically connected to a switch 810 which can be placed into positions 802, 804, or 806. The switch 810 may be variously configured to allow for selective electrical connection of the mediator electrode 261 to the $H_2$ electrode 262 in the case of the position 802 shown in FIG. 8A, and the rebalance electrode 260 in the case of the position 804 shown in FIG. 8B. When it is desired to decrease the $Fe^{3+}$ concentration of the mediator, the current collector 701 may be connected via the switch 810 in the position 802 to the hydrogen anode terminal 308 as shown in FIG. 8A. When it is desired to increase the $Fe^{3+}$ concentration of the mediator up to the same concentration as in the electrolyte, the mediator current collector 701 may be connected via the switch 810 in the position 804 to the rebalancing cathode terminal 302 as shown in FIG. 8B. Once the desired $Fe^{3+}$ concentration is achieved in the mediator solution, the switch 810 may be placed in the neutral position 806, leaving the mediator current collector at open-circuit as shown in FIG. 8C.

In an Fe/Cr RFB system, when the mediator electrode is connected to the anode, the reactions are:

$$\text{Anode } H_2 \rightarrow 2H^+(m) + 2e^- \quad E^\circ = 0.000 \quad \text{EQ(26)}$$

$$\text{Mediator } 2Fe^{3+}(m) + 2e^- \rightarrow 2Fe^{2+}(m) \quad E^\circ = 0.771 \quad \text{EQ(27)}$$

The combined effect of these reactions is to decrease the $Fe^{3+}$ concentration in the mediator solution. When the mediator is connected to the cathode, the reactions are:

$$\text{Mediator } 2Fe^{2+}(m) \rightarrow 2Fe^{3+}(m) + 2e^- \quad E^\circ = -0.771 \quad \text{EQ(28)}$$

$$\text{Cathode } 2Fe^{3+}(e) + 2e^- \rightarrow 2Fe^{2+}(e) \quad E^\circ = 0.771 \quad \text{EQ(29)}$$

The combined effect of these reactions is to increase the $Fe^{3+}$ concentration in the mediator solution.

When the rebalancing reaction involves a spontaneous reaction such as the $Fe^{3+}$ reduction example above, a power supply is not needed and may therefore be omitted from the rebalance system. When rebalancing involves a non-spontaneous reaction, such as the reduction of $Cr^{3+}$, a power supply 332 may be connected to the current collector terminal 308 at the hydrogen cell anode and the current collector terminal 302 at the rebalancing cell cathode as schematically shown in FIG. 8A. The power supply 332 may be similarly coupled in the examples shown in FIG. 8B and FIG. 8C.

Removing Catalytic Contaminants from a Mediator Solution

The systems and methods disclosed above may substantially lower the rate at which electrode catalysts such as platinum may enter the RFB electrolytes and plate out on the negative electrodes of RFB cells. However, over long periods of operation, the catalysts may eventually build up in the mediator solution to a point where they can again transfer to the redox electrolytes. Before that point is reached, it may be desirable to remove the dissolved catalyst species from the mediator solution. One method for removing metallic contaminants from solution is to electroplate the metal(s) in a flow-through cell containing a high surface area electrode material such as carbon felt or carbon black. Systems for electro-deposition of metals from aqueous solutions are well known, and in some cases are referred to as electrowinning or electroextraction systems or processes. Any of the various flow cells described above or other flow cells may be configured and operated in order to remove one or more catalytic contaminants (e.g., Pt, Rh, Pd or others) from the mediator solution.

Unlike conventional electroplating processes, which are operated under current control and allow the plating potential to vary widely, the selective plating of a single metal may be more efficiently achieved by maintaining the plating electrode within a specific range of electric potential. An application of such "potentiostatic" control for depositing platinum on carbon was described in "Potentiostatic Electrodeposition of Pt Nanoparticles on Carbon Black," Masao Miyake, et al., J. Electrochem. Soc., Jul. 19, 2011, 158(9), D590-D593 ("Miyake") the contents of which are incorporated herein by reference. In that case, the potentiostatic control was achieved with specialized electronic equipment. In Miyake, acidic solutions for the electrodeposition of Pt were prepared by dissolving 38.6 mM (=mmol dm$^{-3}$) of platinum as $H_2PtCl_6 6H_2O$ (about 7500 ppm of the metal) in a 0.1 M $H_2SO_4$ aqueous solution. A paste of carbon black (Ketj$_e$n Bl$_a$ck EC) impregnated with the above electrolytic solution was sandwiched between two sheets of filter paper (Watman, Grade 50) and the rim of the sheets was folded so that the paste would not leak out during the electrodeposition. A Pt lead wire was inserted through a hole in the filter paper and attached to the carbon paste. The carbon paste and the filter paper was placed on the bottom of an electrolytic cell (100 ml) containing 25 ml of the electrolytic solution and potentiostatic electrodeposition was carried out at room temperature with an electrochemical analyzer (ALS, model 660 C) using a porous carbon counter electrode and an Ag/AgCl reference electrode immersed in a 3 M NaCl solution. The potential of this Ag/AgCl reference electrode corresponds to approximately 0.3 V vs. RHE (the reversible potential of the hydrogen electrode in 0.1M $H_2SO_4$ solution).

In Miyake, electrodeposition was performed at −0.2, −0.7 and −1.0 V vs Ag/AgCl (or approximately 0.1, −0.4 and −0.7V vs. RHE). The current efficiency for platinum deposition approached 100% above 0.0V vs. RHE but was less than 60% at the more negative potentials where part of the current was consumed by hydrogen evolution. These observations demonstrate that platinum or other precious metals can be deposited efficiently on carbon electrodes at controlled potentials at or above 0.0V vs. RHE, thereby minimizing or preventing bulk deposition of iron, chromium or other desirable dissolved metals that will take place on the platinized electrode.

In one embodiment, potential-controlled electrodeposition may be implemented in a flow-through cell, greatly improving the rates of platinum removal over those achieved by Miyake. In another embodiment, advantage may be taken of an electrochemical phenomenon known as "underpotential deposition" whereby single atoms of one metal (such as iron) can deposit on the surface of a second metal of larger work function (such as platinum) at electrode potentials positive to that required for bulk deposition. In the case of iron dissolved in an acidic RFB electrolyte, underpotential deposition on platinum would begin at or below a potential of about 0.2V vs. RHE. The quantity of iron removed from solution would be negligible because the driving force for underpotential deposition ceases as soon as one or two layers of atoms have been deposited. Hence, no further removal of iron may take place until additional platinum plates out. The net effect is to cover up the platinum surface as soon as it is formed, reducing the undesirable possibility that it may redissolve in the electrolyte. Other embodiments are also possible and may be used with the systems described herein.

The selective removal of catalytic metals such as platinum from mediator solutions may be accomplished without the use of specialized electronic equipment by exploiting the principle of "mixed potentials." When an electrode is immersed in an electrolyte containing more than one electrochemical couple, (such as two pairs of redox species), the two electrode reactions take place simultaneously at equal and opposite rates (one anodic and one cathodic) on the electrode, which will settle at a "mixed potential" somewhere between the standard electrode potentials of the two couples. For example, as described in Diel referenced above, a mixed potential electrode was used for lowering the $Fe^{3+}$ content of a plating bath. In that example, the mixed potential lay somewhere between 0.0V, which is the standard potential of the $H_2/H^+$ couple, and 0.77V, which is the standard potential of the $Fe^{2+}/Fe^{3+}$ couple. The precise value of a mixed potential depends on the relative reaction rates of the two couples.

Figure 9:
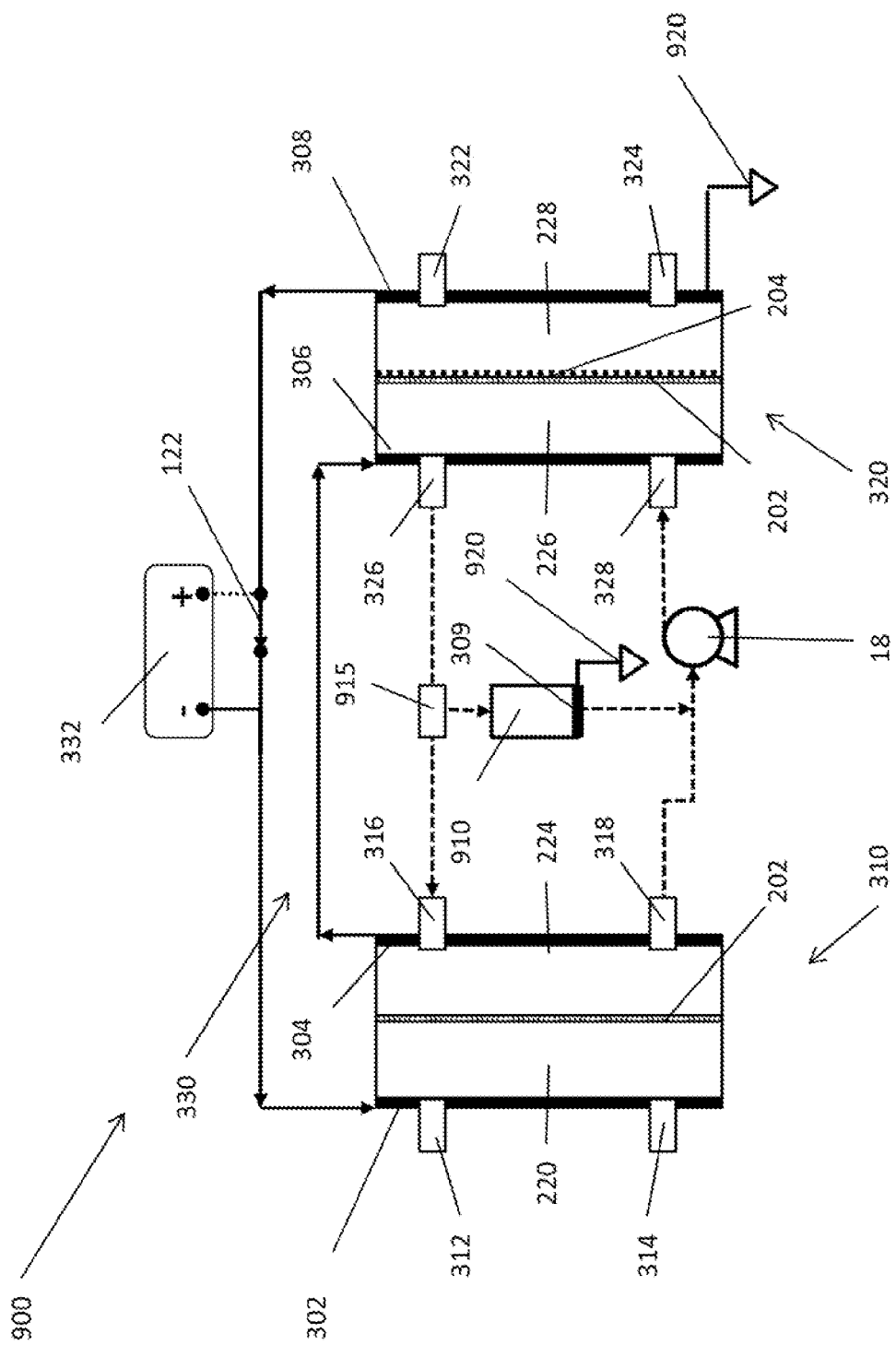
FIG. 9 is a diagram illustrating a two cell embodiment of an electrochemical system for electrolyte rebalancing having a bypass cell.

Mixed potentials can be manipulated within electrochemical systems by connecting two electrodes together via an external circuit. For example, FIG. 9 shows an embodiment that may provide for the removal of dissolved catalysts such as platinum from a circulating mediator solution. The system of FIG. 9 is configured such that most of the mediator solution may flow as usual through the anode chamber of the rebalance cell 202 but a small proportion of the electrolyte may be diverted via valve 915 through a plating cell 910. The plating cell may be occupied by a single porous electrode material such as carbon felt, which may be connected to a carbon plate 309 acting as a plating terminal.

In some embodiments, the plating terminal 309 and the hydrogen cell anode terminal 308 may be connected to a common point 920, thereby maintaining the plating terminal 309 of the plating cell 910 at a mixed potential very close to 0.00V. This potential may be low enough not only to reduce redox reactants such as $Fe^{3+}$ or $Cr^{3+}$ to their lower oxidation states but also to electrodeposit noble metals like platinum onto the plating cell electrode 309. However, the potential may be prevented from being so low as to plate out more active metals, such as iron, chromium or other metals that may be used as active reactants in RFB electrolytes.

If needed, the plating cell electrode potential may be adjusted up or down by altering the proportion of the mediator solution that is diverted through the plating cell 910. In some embodiments, such an arrangement may take advantage of the "shunt current" effect, whereby the anode and cathode sites are located in different cells within the electrochemical system. The effect is normally one to be avoided but in this example, the plating cell current may be small enough that undesirable energy losses may be minimal.

In some embodiments, mixed potentials may be exploited for selective removal of catalyst species even when the mediator is not circulated. For example the embodiments of FIGS. 7A and 7B may be adapted to remove catalyst species using mixed potentials. In such an embodiment, the mediator electrode 270 may be periodically electrically connected (or short-circuited) to the hydrogen electrode 262. While so-connected, the concentration of oxidized reactants (e.g., [$Fe^{3+}$] where the square brackets indicate a molar concentration) in the mediator solution will decrease and the mixed potential may move down towards 0.0V, thereby causing catalytic contaminants such as platinum to plate out on the central electrode 270. If desired, the porous electrode material of the mediator electrode 270 may then be removed and replaced.

In other embodiments, mixed potentials may be adjusted to plate out catalyst species by adjusting the operating conditions of the rebalancing system. For example, in FIG. 6A, lowering the flow rate of the RFB electrolyte through rebalancing chamber 260 may cause a corresponding decrease in the rate at which reduced species (e.g., $Fe^{2+}$) are consumed in the mediator solution. Since the production rate of the reduced species in that chamber remains constant, the concentration of the oxidized species will fall and the mixed potential of the mediator electrode 270 may be driven into a range where electrodeposition of platinum or other catalytic contaminants can take place.

Alternatively, increasing the rate at which hydrogen flows through the anode chamber 262 may produce the same result by increasing the rate at which oxidized species are converted to reduced species in the mediator solution, again driving down the mixed potential of the mediator electrode 270 into a range that favors catalyst deposition.

Multiple Cell Stacks for Rebalancing

Figure 10A:
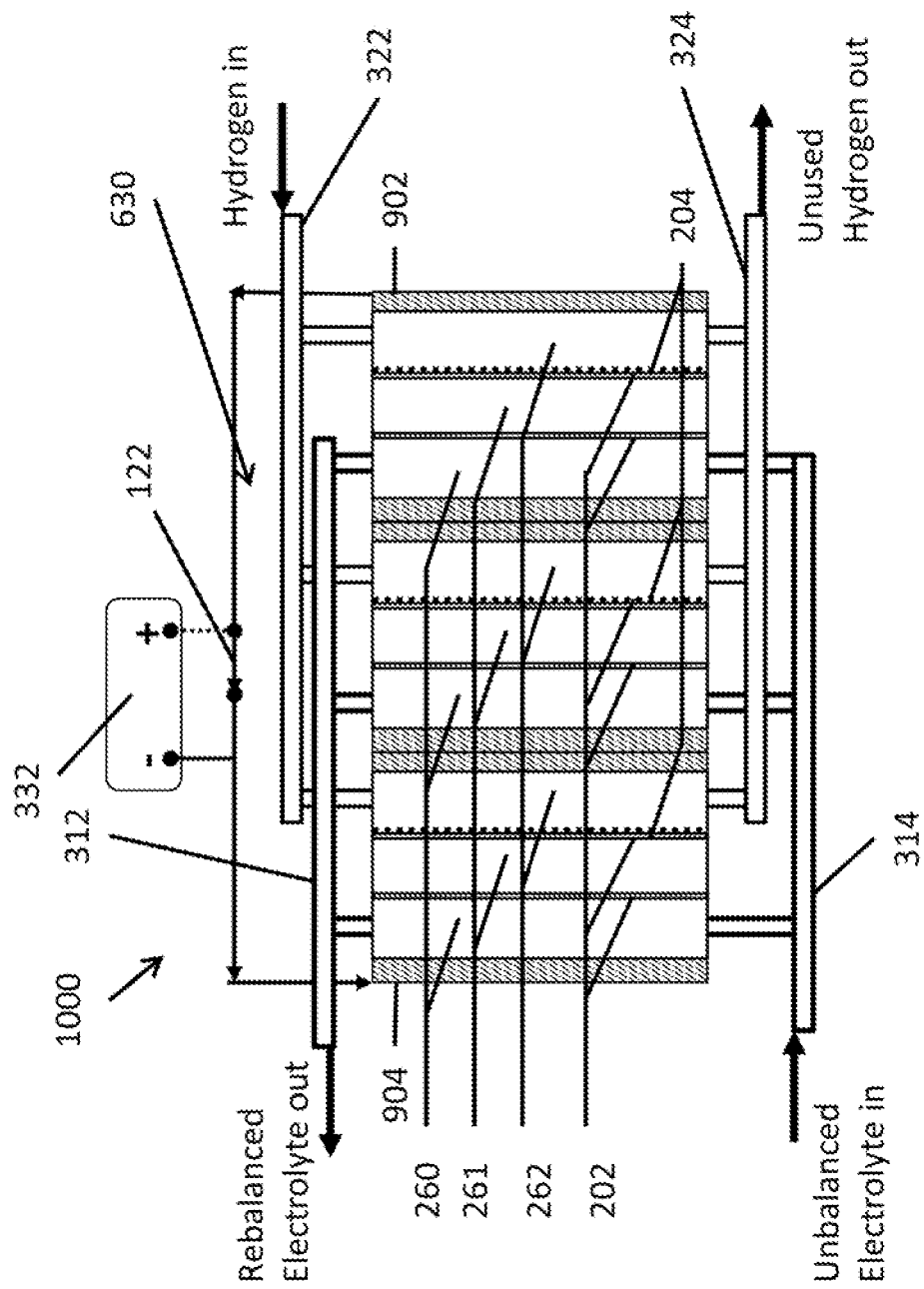
FIG. 10A is a diagram illustrating a three cell stack embodiment of an electrochemical system for electrolyte rebalancing having a stack of three chambered cells.
Figure 10B:
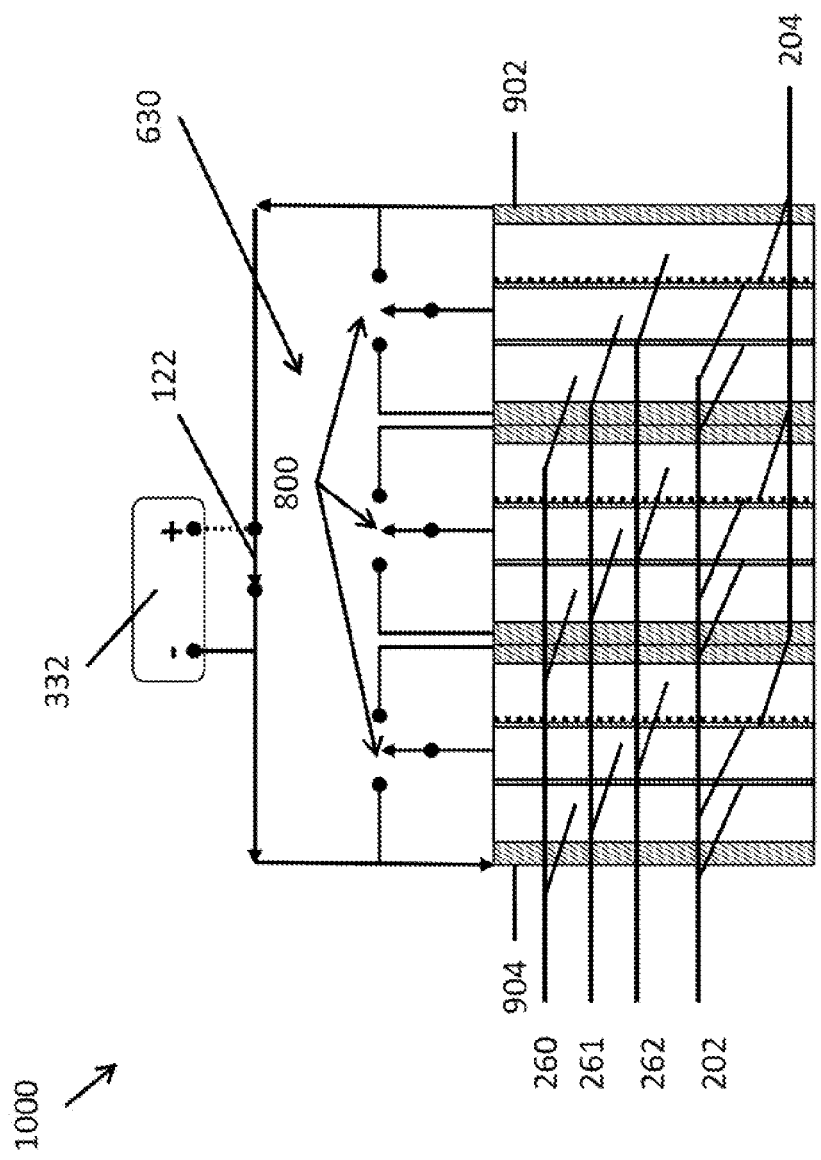
FIG. 10B is a is a diagram illustrating a three cell stack embodiment of an electrochemical system for electrolyte rebalancing having a stack of three chambered cells and switched electrical connections.

In some embodiments, multiple rebalancing cells may be stacked together so that the rebalancing current flows through several cells in series. For example, FIGS. 10A and 10B show a stack 1000 of three three-chamber cells connected in series. As illustrated, in some embodiments all anode chambers 262 may be fed with hydrogen from a common anode manifold 322 and all cathode chambers 260 may be fed with electrolyte from a common cathode manifold 314. The carbon plates 210 between each pair of adjacent cells may be bi-polar plates. Similarly, the cells of any two-cell mediated rebalancing system, such as those shown in FIGS. 3-5 may be stacked together into blocks of cells.

A rebalance system may have many cells but in practice, the number and arrangement of cells within the rebalance system will depend on operating characteristics of the RFB and on flow-rate restrictions imposed by the need to limit or reverse the buildup of catalyst species in the mediator solution. In general, more cells in a rebalance stack may result in a faster rebalancing reaction. In various embodiments, the number of cells in a rebalance cell stack may be based on any of several considerations. For example, if a power supply is needed to drive a non-spontaneous rebalancing reaction, a larger number of rebalance cells in parallel means a higher voltage, and a lower current will be needed to maintain a particular rebalancing rate. More cells may also have an impact on a pump to be used in a rebalancing system, since more cells may require a higher pump flow rate. In some cases, the choice of the number of cells in a rebalance system may be partly based on shunt currents in the rebalance system. A maximum shunt current will typically occur in the middle cell of a stack, and is proportional to n(n−1), where n is the number of total cells in the rebalance stack. In some embodiments, a rebalance stack may have about 20 to 30 cells.

In the embodiments of FIGS. 10A, and 10B, an electronic circuit 630 may connect the end terminals 902 & 904 and may carry the current for rebalancing. As shown in FIG. 10B (fluid connections are omitted from FIG. 10B for clarity), 3-position electrical switches 800 may be provided at the mediator electrode for adjusting the composition of the mediator solution. The three-way switches 800 may be set to connect the mediator electrode to the cathode or to the anode, as discussed above with reference to FIGS. 8A, 8B, and 8C.

Rebalancing Electrolyte by Reducing Species in Negative Electrolyte

As discussed above, electrolyte imbalance can be corrected either by decreasing the concentration of the redox reactant (e.g., $Fe^{3+}$) in the positive electrolyte, or by increasing the concentration of the reactant (e.g., $Cr^{2+}$) in the negative electrolyte. Examples of systems and methods for reducing $Fe^{3+}$ to $Fe^{2+}$ using hydrogen as the reducing agent have been described above. The reduction of $Cr^{3+}$ to $Cr^{2+}$ is analogous, and can be described by the reactions below.

Anode $H_2 \rightarrow 2H^+(m)+2e^- E°=0.000$   EQ(30)

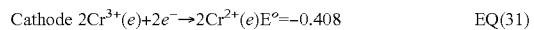
Cathode $2Cr^{3+}(e)+2e^- \rightarrow 2Cr^{2+}(e) E°=-0.408$   EQ(31)

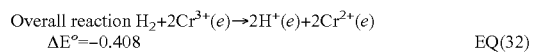
Overall reaction $H_2+2Cr^{3+}(e) \rightarrow 2H^+(e)+2Cr^{2+}(e)$
$\Delta E°=-0.408$   EQ(32)

As indicated by the negative sign of ×E°, the overall reaction is not spontaneous and instead requires an input of energy, such as from an external power supply. In some embodiments, any of the rebalancing systems utilizing a mediator solution described above with reference to FIGS. 3-10 may be suitable for implementing reaction EQ(32) in the negative electrolyte. The only significant difference to the embodiments described in the context of reducing a positive electrolyte reactant (e.g., reducing $Fe^{3+}$ to $Fe^{2+}$) is the addition of a power supply 332 to augment the cell voltage. Depending on the configuration being used, a power supply 332 may be connected to the electronic circuit 130 (FIG. 4), 330 (FIG. 5), or 630 (FIG. 6A) via a switch 122.

In various embodiments, the negative electrolyte to be rebalanced (which may readily contain some $Cr^{2+}$ in some embodiments) may be pumped into the cathode chamber 220 (FIG. 3-5) or 260 (FIGS. 6A-8C) of a rebalance cell (or in parallel into multiple rebalance cells 260 in a rebalance stack such as those shown in FIGS. 10A and 10C). At the same time, hydrogen gas may be flowed through the anode chamber 228 (FIG. 3-5) or 262 (FIGS. 6A-8C) of a hydrogen cell (or in parallel into multiple hydrogen cells 262 in a rebalance stack such as those shown in FIGS. 10A and 10C). In some embodiments, the anode chambers 228 (FIGS. 3-5) and 262 (FIGS. 6A-8C) may also include a catalyst, such as platinum (Pt). For example, a catalyst-containing coating may be applied to a surface 204 of the membrane 202 on the anode chamber side.

The rebalancing approach based on the reduction of $Fe^{3+}$ to $Fe^{2+}$ is attractive due to the spontaneous reaction. In the case of rebalancing by reducing $Cr^{3+}$ to $Cr^{2+}$, there appears to be a disadvantage in that an external power supply is required to drive the reaction. This means that more energy is needed to rebalance the negative electrolyte than is needed to rebalance the positive electrolyte. However, Applicants have recognized that, when viewed in the context of the total energy of the system, this apparent disadvantage disappears. In the case of reduction of $Fe^{3+}$ reduction in the catholyte, the rebalance reaction does not consume extra energy but does not restore the energy that was already lost when hydrogen was generated by the battery. On the other hand, reduction of $Cr^{3+}$ in the anolyte requires extra energy but the energy lost to hydrogen generation may be restored in the rebalancing process. A major advantage to rebalancing by $Cr^{3+}$ reduction approach is that potential of the electrolyte involved in the rebalancing reaction is always more negative relative to hydrogen, because it is determined by the couple $Cr^{2+}/Cr^{3+}$. At such negative potential, $Fe^{3+}$ cannot exist in the solution. As such, this negative electrolyte, when it leaks to the hydrogen side, cannot oxidize the Pt metal and thus the risk of Pt dissolution and contamination of the flow battery electrolytes and cells is significantly reduced.

Figure 11:
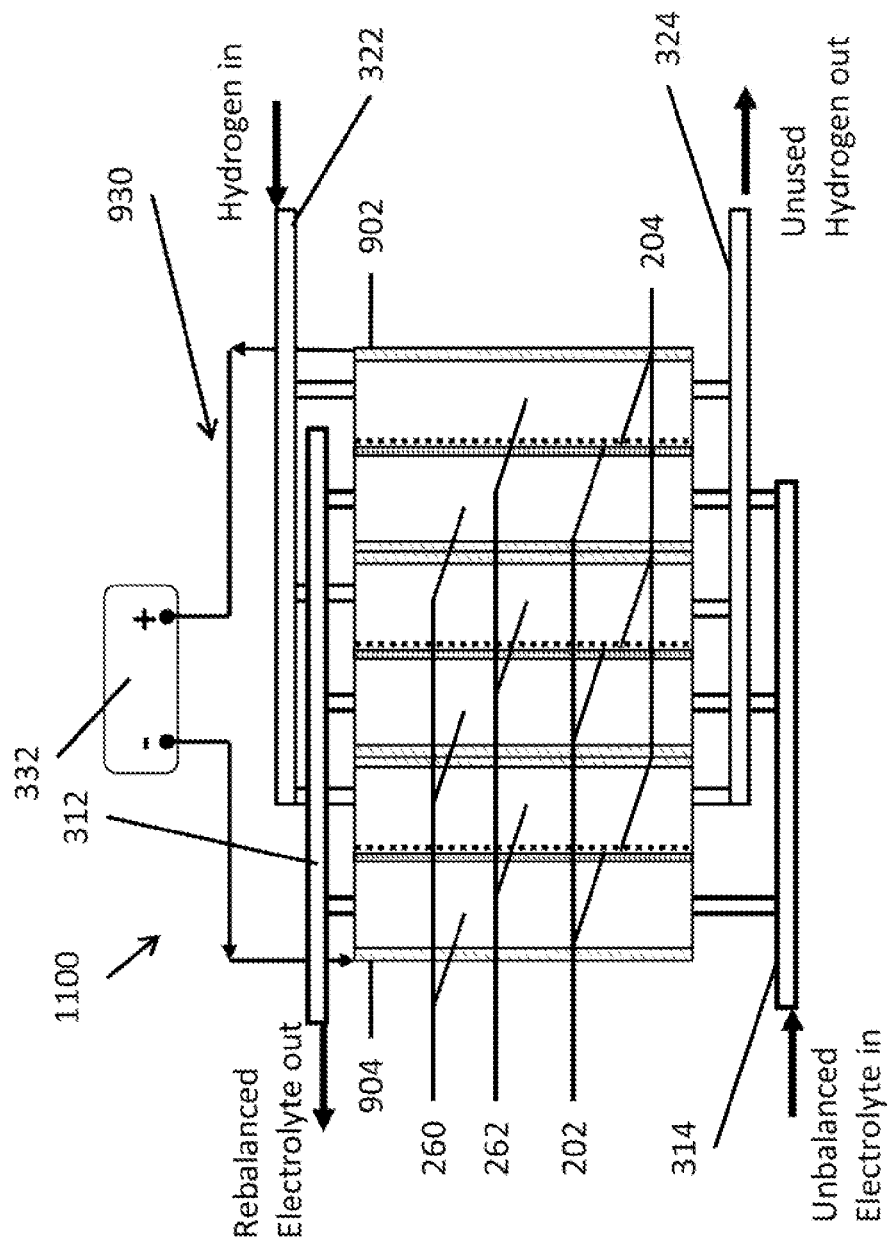
FIG. 11 is a diagram illustrating a three cell stack embodiment of an electrochemical system for electrolyte rebalancing having two chambered cells for processing negative electrolyte.

One embodiment for rebalancing the negative electrolyte without the use of a mediator solution is shown in FIG. 11. In the illustrated example, multiple cells are shown in a series-connected stack 1100, but a single cell may also be used. Apart from the addition of a power supply, this system may operate in substantially similar ways as the examples described above. Hydrogen may be flowed through the anode chambers 262 where it is oxidized to H$^+$ ions, releasing electrons. At the same time, the electrolyte to be rebalanced may be pumped through flow-through electrodes in the cathode chambers 260 where the oxidized species in the electrolyte, e.g., $Cr^{3+}$ take up electrons to form the corresponding reduced species, e.g., $Cr^{2+}$. As in previous embodiments, a coating layer 204 containing a catalyst such as platinum (Pt) may be coated onto the negative (Hydrogen) side of the membrane 202. As described above with reference to various examples, proton exchange membranes may be made of a variety of materials, and various materials and methods for forming catalyst-containing coatings on a membrane may be used.

A power supply 332 may also be connected to the stack of FIG. 11. In the case of a stack of series-connected cells, the power supply 332 and a power supply circuit 930 may be electrically connected to a negative terminal plate 902 and to a positive terminal plate 904 at the ends of the stack. The power supply 332 may also include an electronic controller configured to start, stop and control a rebalancing process according to any of the embodiments described herein. The hydrogen may be supplied to the anode chambers 260 through a hydrogen supply line 322 from any suitable hydrogen source, such as those described elsewhere herein, and unused hydrogen may be withdrawn through an outlet line 324.

The electrolyte to be rebalanced may be supplied to the rebalance stack 1100 by an electrolyte supply line 314, and rebalanced electrolyte may be returned to an RFB system via an electrolyte return line 312. In some embodiments, the electrolyte supply line 314 and/or the electrolyte return line 312 may be connected to an electrolyte storage tank, such as a negative electrolyte storage tank. In other embodiments, the electrolyte supply line 314 and/or the electrolyte return line 312 may be connected to an RFB charge and/or discharge stack assembly.

As shown in FIG. 11 and as described above, multiple rebalance cells may be combined in a rebalance stack in a bipolar arrangement. In general, a rebalance stack with a larger number of cells may allow for faster rebalancing of electrolytes. Rebalance speed may be balanced with competing factors such as cost, power supply requirements, pumping power, etc. In some embodiments, a rebalance stack configured to rebalance a negative electrolyte may have five cells with an active area of about 200 cm$^2$. In other embodiments, a rebalance stack may have fewer or more cells of any size and configuration depending on the needs of a particular application.

When rebalancing a negative electrolyte, it may be desirable to begin rebalancing when the negative electrolyte is at least partially charged—that is, when the negative electrolyte contains at least some quantity of a charged ionic species (e.g., $Cr^{2+}$). This is because a negative electrolyte solution can be expected to contain at least small quantities of a positive charged reactant species (e.g., $Fe^{3+}$) due to migration of such ions across the flow battery's separator membrane(s). If the negative electrolyte is fully discharged, such charged positive reactant species may remain and may therefore cross the separator in the rebalance cell and react to dissolve the catalyst as described above. As the negative electrolyte is charged, any charged positive reactant ions (e.g., $Fe^{3+}$) that might be present will be reduced by reaction with the charged negative reactant ions (e.g., $Cr^{2+}$), thereby ensuring that a slightly charged negative electrolyte is at a negative potential relative to hydrogen. Therefore, it may be desirable to direct a negative electrolyte into a rebalance cell when the negative electrolyte has (or is expected to have) a molar concentration of charged negative ions of between about 0.05M and 0.5M or more. Phrased differently, it is desirable to rebalance a negative electrolyte when the probability of the negative electrolyte containing charged positive reactant ions is substantially zero.

On the other hand, in order to minimize the risk of parasitic hydrogen generation in the rebalance cell, it may be desirable to rebalance a negative electrolyte when it is at a relatively low SOO. For example, in some embodiments, a negative electrolyte may be rebalanced when the negative electrolyte is in a relatively discharged state, such as at an absolute-value SOO (denoted as |SOO|) of less than about 50%. In other embodiments, a negative electrolyte may be rebalanced when it is at an |SOO| of less than about 40%, less than about 30%, or less than about 20%. In some embodiments, it may be desirable to begin a rebalancing process with the negative electrolyte at a sufficiently low |SOO| that the electrolyte exiting the rebalancing system is still at a relatively low |SOO|. However, it is not necessarily required that the negative electrolyte be at a low |SOO| prior to rebalancing, so in some embodiments, the negative electrolyte may be rebalanced when it is at an |SOO| of nearly (but still less than) 100%.

The rate of the rebalancing process using a system such as that shown in FIG. 11 may generally depend on factors such as a supplied electrical current, a rate at which electrolyte is supplied to the cell, and a rate at which hydrogen is supplied to the cell. Any or all of these may be varied in order to achieve a desired rebalance rate. For example, in some embodiments it may be desirable to keep pumping rates as low as possible to minimize the energy expense of operating pumps.

Hydrogen may be supplied to the anode chamber(s) 262 at a rate and/or in a quantity sufficient to meet or exceed a quantity required for a desired rebalancing operation rate. Hydrogen gas may be supplied to the anode chamber(s) 262 in various ways. For example, in some embodiments the anode chamber(s) 262 may be configured as a termination, or in a "dead-end" fashion, such that $H_2$ gas may flow into, but not out of the anode chamber(s) 262. In such embodiments, the anode chamber may be configured to include no outlet for excess $H_2$ gas such that the gas in each anode chamber may be maintained at a sufficient pressure to supply sufficient $H_2$ gas to at least meet a rate of consumption required by a chosen reaction rate. In other embodiments, $H_2$ gas may be flowed into the anode chamber(s) 262 at a sufficient flow rate to meet or exceed a rate of $H_2$ consumption required to maintain a chosen reaction rate. Any un-used $H_2$ gas may be allowed to exit the anode chamber 228 and may be vented to atmosphere, or may be captured and re-directed to a source of hydrogen gas. In some such embodiments, $H_2$ gas may be supplied either by pressure or flow rate, at a rate sufficient to sustain at least 120% of a consumption rate required to maintain a desired reaction rate. In still further embodiments, hydrogen gas may be supplied in a continuously recirculating fashion. In such embodiments, hydrogen gas may be circulated between a source such as a hydrogen tank and the anode chamber(s) 262 at a flow rate sufficient to meet or exceed a desired consumption rate. In some embodiments, a rate of actual or expected hydrogen consumption may be determined by experimentation or by calculation based on other factors affecting the rebalancing reaction rate.

As in previous embodiments, some portion of the hydrogen consumed in the anode chamber(s) 262 may be captured from an RFB system using any suitable gas separation and transport devices as needed. In some embodiments, the quantity of hydrogen captured from the RFB may be measured and subtracted from a total required quantity of hydrogen to be supplied by another source. As above, additional hydrogen may be supplied from a tank or any other source.

In some cases, it may also be desirable to establish a catalyst layer on a porous electrode in an electrolyte chamber in order to suppress un-desired hydrogen generation in the rebalance system. For example, a porous electrode in the cathode chamber 260 in the system of FIG. 11 may be coated or plated with a hydrogen-suppressing material or catalyst. Similarly, a hydrogen-suppressing material may be coated or plated on a porous electrode in the cathode chamber 206 in the system of FIG. 2A, in the cathode chamber 220 in FIG. 3-FIG. 5, in the rebalance chamber 260 in FIG. 6A-8C, in the electrolyte chamber 1006 in FIG. 12A, or other similar systems. Suitable hydrogen suppressing materials may include layers of one or more of bismuth, gold, lead, silver, titanium, tungsten carbide, zirconium carbide, or other carbide and nitride compounds.

In some cases, the benefits of rebalancing a negative electrolyte may also be enjoyed by flow battery systems using other reactants. For example, in some embodiments of an all-vanadium (V/V) flow battery, the positive reactant discharged species may be $V^{4+}$, the positive reactant charged species may be $V^{5+}$, the negative reactant discharged species may be $V^{3+}$, and the negative reactant charged species may be $V^{2+}$. In an iron-vanadium (Fe/V) flow battery system, the positive reactant discharged species may be $Fe^{2+}$, the positive reactant charged species may be $Fe^{3+}$, the negative reactant discharged species may be $V^{3+}$, and the negative reactant charged species may be $V^{2+}$. In some embodiments of a cerium-vanadium flow battery system, the positive reactant discharged species may be $Ce^{3+}$, the positive reactant charged species may be $Ce^{4+}$, the negative reactant discharged species may be $V^{3+}$, and the negative reactant charged species may be $V^{2+}$.

Electrolyte Rebalancing Cell with Integrated Hydrogen Generator

Some embodiments of the systems and methods described above require a source of hydrogen. In some embodiments, a source of hydrogen may be generated on-site by a hydrogen generator. In other embodiments, a hydrogen generator may be integrated into a rebalance cell.

An embodiment of such an integrated hydrogen generator system in a three-chambered cell system 1200 is shown in FIGS. 12A and 12B. Each of the three chambers 1006, 1007, 1008 may by occupied by a porous electrode material 216 such as carbon felt. However, in this system only the outer two chambers 1006 and 1008 contain electrolyte. The electrolyte in chamber 1006 is the RFB electrolyte to be rebalanced, containing for example, an excess of $Cr^{3+}$ ions. The electrolyte in chamber 1008 may be a solution of sulfuric acid, phosphoric acid or another strong acid. The carbon felt 216 occupying the center chamber 1007 may be configured to serve as a gas-diffusion layer (GDL). The three chambers may be separated by ion exchange membranes such as cation exchange membranes. In some embodiments, catalysts such as platinum may be coated on three of the four membrane surfaces 204a, 204b, 204c.

When voltage is applied as shown in FIG. 12A between the carbon end plates 1004 and 1005, current flows through the three-chamber assembly driving different processes in each chamber as indicated in the diagram of FIG. 12B. In chamber 1008, an anodic reaction may take place at the first catalyzed surface 204a of the ion exchange membrane 202, yielding oxygen gas and protons ($H^+$ ions). The corresponding equation is:

$$H_2O \rightarrow 2H^+ + \tfrac{1}{2}O_2 + 2e^- \quad \text{EQ(33)}$$

The oxygen gas may be released to the atmosphere, the protons may pass through the membrane 202 to the middle chamber 1007, and the electrons may flow via the carbon plate 1004 to external circuit 1030.

In middle chamber 1007, protons arriving through the first ion exchange membrane 202 from chamber 1008 may react with electrons to form hydrogen gas at the second catalyzed surface 204b. The corresponding reaction is:

$$e^- + H^+ \rightarrow \tfrac{1}{2}H_2 \quad \text{EQ(34)}$$

The hydrogen gas may diffuse across the middle gas diffusion chamber 1007 to the second ion exchange membrane 203 where it undergoes an anodic reaction at the third catalyzed surface 204c, re-forming protons and electrons. The corresponding equation is:

$$\tfrac{1}{2}H_2 \rightarrow e^- + H^+ \quad \text{EQ(35)}$$

The protons migrate through the membrane 203 to the rebalance chamber 1006 and the electrons migrate back towards the first membrane 202.

In the rebalance chamber 1006, a cathodic reaction takes place within the pores of the carbon felt, converting oxidized species, e.g., $Fe^{3+}$ or $Cr^{3+}$ to the corresponding reduced species, e.g., $Fe^{2+}$ or $Cr^{2+}$, respectively. The corresponding equations are $$e^- + Fe^{3+} \rightarrow Fe^{2+} \quad \text{EQ(36)}$$

or $$e^- + Cr^{3+} \rightarrow Cr^{2+} \quad \text{EQ(37)}$$

The overall reaction is $$H_2O + 2Fe^{3+} \rightarrow \tfrac{1}{2}O_2 + 2Fe^{2+} + 2H^+ \quad \text{EQ(38)}$$

or $$H_2O + 2Cr^{3+} \rightarrow \tfrac{1}{2}O_2 + 2Cr'^{2+} + 2H^+ \quad \text{EQ(39)}$$

It may appear that the two reactions of EQ(34) and EQ(35) in the middle chamber 1007 add up to null and therefore have no function. However, the middle chamber may function as a barrier to the transfer of water between the anode and the cathode chamber by electro-osmosis, which is a phenomenon in which protons and other ions carry a sheath of water molecules with them as they migrate through membranes. At the same time, the gas diffusion chamber still allows $H_2$ to pass from the anode side to the cathode side, and electrons to flow from the cathode side to the anode side through the conductive GDL (gas diffusion layer). Without the middle chamber, the cathode and the anode chamber would be separated by only a membrane and the transfer of water by electro-osmosis would be much faster and difficult to control.

As in the previous embodiments, the rate of rebalancing may be controlled to be any constant or variable rate as desired. The rebalancing rate in a system such as that shown in FIGS. 12A & 12B may depend on controllable factors such as an applied electric current, a rate of supply of electrolyte to be rebalanced and a rate of supply of acid into the anode chamber 1008.

Control Electronics

Figure 13:
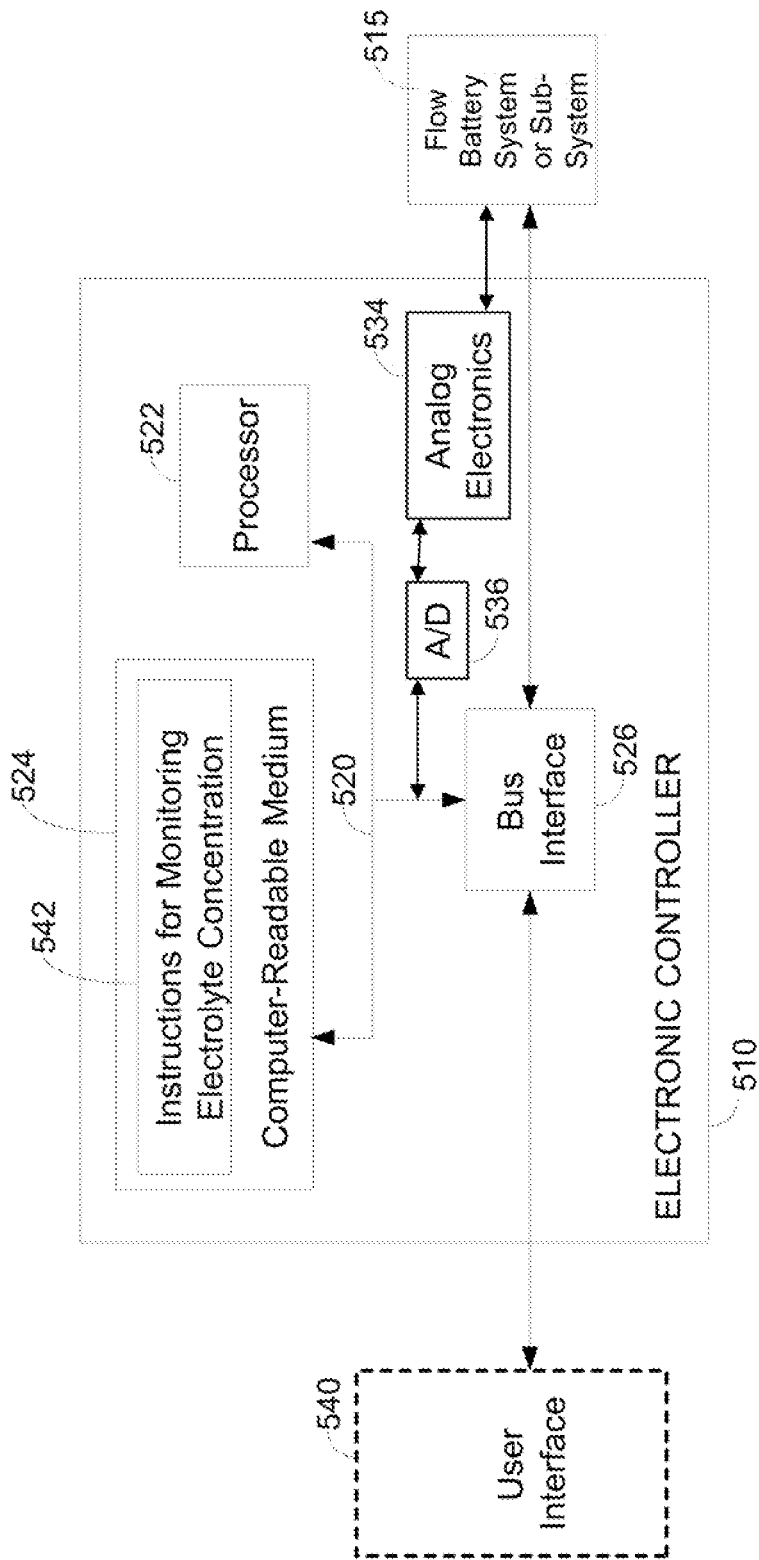
FIG. 13 is a block diagram illustrating an embodiment of an electronic controller for electronically controlling the operation of various embodiments of an electrochemical system for electrolyte rebalancing.

The extent, timing, frequency and other characteristics of rebalancing processes using any rebalancing embodiment may be controlled by an electronic controller. An example of such an electronic controller is provided in the schematic block diagram of FIG. 13. The electronic controller 510 may be used to control a system 515 such as an entire RFB system, or a sub-system of the flow battery, such as a rebalance sub-system or an electrolyte concentration monitoring sub-system (or all of these). In this example, the electronic controller 510 may be implemented with a bus architecture, represented generally by the bus 520. The bus 520 may include any number of interconnecting buses and bridges depending on the specific application of the electronic controller 510 and the overall system constraints.

The bus 520 may link together various circuits including one or more processors, represented generally by the processor 522, and computer-readable media, represented generally by the computer-readable medium 524. The bus 520 may also link various other circuits such as timing sources, peripherals, sensors, and power management circuits, which are well known in the art, and therefore, will not be described any further. A bus interface 526 may provide an interface between the bus 520 and the system to be controlled 515. Depending upon the nature of the apparatus, a user interface 540 (e.g., keypad or input device, mouse or pointing device, display, speaker, microphone, joystick) may also be provided.

The processor 522 may be configured to manage the bus 520 and general processing, including the execution of software or instructions 532 stored on the computer-readable medium 524. The software, when executed by the processor 522, may cause the electronic controller 510 to perform any of the various control functions described above for any particular apparatus. The computer-readable medium 524 may also be used for storing data that is manipulated by the processor 522 when executing software or instructions 532.

In some embodiments, analog electronics 534 may also be joined to the bus 520 by an analog-to-digital converter (and in some embodiments a digital-to-analog converter) 536. Analog electronics 534 may be provided to perform various analog functions such as voltage regulation, electric current measurement, current regulation or other functions. Such analog electronics may provide sensor data to the controller for use by software or other instructions in performing various control actions. The computer readable medium 524 may also contain instructions 542 that when read by a processor or computer cause the processor or computer to perform operations for controlling the analog electronic components and other circuitry, including digital circuitry, connected thereto.

Although many of the embodiments herein are described with reference to Fe/Cr RFB chemistry, it should be appreciated with the benefit of the present disclosure that some embodiments are applicable to RFB systems (and some hybrid flow battery systems) using other reactants. In addition to the Fe/Cr RFB chemistry, the various embodiments above may be adapted for use with many other RFB chemistries using at least one flowing liquid electrolyte. For example, some known alternative RFB chemistries include: all vanadium (V/V), iron-vanadium (Fe/V), hydrogen bromine (H/Br), tin-iron (Sn/Fe), vanadium cerium (V/Ce), vanadium-polyhalide (V/Br2), iron-bromine (Fe/Br2), titanium-iron (Ti/Fe), iron-ethylenediaminetetraacetic acid-bromine (Fe-EDTA/Br), zinc-cerium (Zn/Ce), zinc-bromine (Zn/Br), and bromine polysulfide (S/Br2).

Although many of the embodiments herein are described with reference to cascade flow RFB architecture, it should be appreciated with the benefit of the present disclosure that some embodiments are applicable to RFBs (and some hybrid flow battery systems) of other architectures, including recirculating systems such as that shown in FIG. 1.

The foregoing description of the various embodiments is provided to enable any person skilled in the art to make or use the systems and methods herein. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

The invention claimed is:

1. A method of rebalancing Fe/Cr redox flow battery electrolytes, the method comprising:
   directing a negative electrolyte solution containing $Cr^{3+}$ ions and $Cr^{2+}$ ions through a cathode chamber of a first rebalance cell, the cathode chamber having a first electrode;
   directing a quantity of hydrogen gas through an anode chamber of the first rebalance cell, the anode chamber having a second electrode and being separated from the cathode chamber by a separator membrane having a catalyst-containing coating on a surface facing the anode chamber;
   applying an electric current to the first rebalance cell; and
   controlling the quantity of hydrogen gas and the electric current applied to the first rebalance cell so as to reduce at least some of the $Cr^{3+}$ ions to $Cr^{2+}$ ions according to a controlled reaction rate for a controlled period of time to rebalance the negative electrolyte solution.

2. The method of claim 1, wherein the negative electrolyte does not contain $Fe^{3+}$.

3. The method of claim 1, wherein the catalyst-containing coating includes platinum.

4. The method of claim 1, wherein the catalyst-containing coating includes a member of the group consisting of tungsten carbide, palladium, platinum alloy, and rhodium.

5. The method of claim 1, wherein the separator membrane includes a cation exchange membrane.

6. The method of claim 1, wherein the negative electrolyte solution directed into the cathode chamber is at a low state of charge, in which a first quantity of the $Cr^{2+}$ ions is less than a second quantity of the $Cr^{3+}$ ions in the negative electrolyte solution.

7. The method of claim 6, wherein the low state-of-charge negative electrolyte solution is at a state of oxidation of less than 50% prior to being directed into the cathode chamber.

8. The method of claim 1, further comprising directing the negative electrolyte solution out of the cathode chamber and into a redox flow battery charging stack.

9. The method of claim 1, further comprising directing negative electrolyte and hydrogen gas through respective cathode and anode chambers of at least a second rebalance cell that is combined with the first rebalance cell in a bipolar stack arrangement.

* * * * *